United States Patent [19]

Kinoshita et al.

[11] Patent Number: 5,584,280
[45] Date of Patent: Dec. 17, 1996

[54] IGNITION DEVICE OF CAPACITOR DISCHARGE TYPE FOR INTERNAL COMBUSTION ENGINE

[75] Inventors: Atsufumi Kinoshita; Norio Sato, both of Numazu, Japan

[73] Assignee: KoKusan Denki Co., Ltd., Shizuoka-ken, Japan

[21] Appl. No.: 578,643

[22] PCT Filed: May 11, 1995

[86] PCT No.: PCT/JP95/00905

§ 371 Date: Jan. 11, 1996

§ 102(e) Date: Jan. 11, 1996

[87] PCT Pub. No.: WO95/31640

PCT Pub. Date: Nov. 23, 1995

[30] Foreign Application Priority Data

May 11, 1994 [JP] Japan .................. 6-097736

[51] Int. Cl.⁶ .......................................... F02P 3/06
[52] U.S. Cl. ................................................. 123/602
[58] Field of Search ................................. 123/602, 427, 123/179 BG, 424, 415, 596, 599, 600, 418, 604, 606; 364/431.04

[56] References Cited

U.S. PATENT DOCUMENTS

| | | | |
|---|---|---|---|
| 4,858,585 | 8/1989 | Remmers | 123/602 |
| 4,924,381 | 5/1990 | Piteo et al. | 123/417 |
| 5,024,204 | 6/1991 | Dykstra | 123/602 |
| 5,050,553 | 9/1991 | Erhard | 123/418 |
| 5,070,839 | 12/1991 | Okuda | 123/416 |
| 5,433,184 | 7/1995 | Kinoshita et al. | 123/602 |
| 5,493,496 | 2/1996 | James et al. | 364/431.04 |

*Primary Examiner*—Raymond A. Nelli
*Attorney, Agent, or Firm*—Pearne, Gordon, McCoy & Granger

[57] ABSTRACT

Ignition operation is carried out by charging a capacitor (C1) of an ignition circuit (3) by means of an output of a positive half cycle of an exciter coil (104) and discharging charges in the capacitor (C1) through a thyristor (Th1). A transistor (Tr4) is turned on when a level of a detected value (Vb) of an output voltage of a negative half cycle of the exciter coil coincides with a level of a reference voltage (Vr), resulting in a reference signal being generated. Measuring of an ignition timing operated by a microcomputer (4) is started at a generation position of the reference signal, so that the ignition timing is measured, the thyristor (Th1) is fed with an ignition signal, leading to ignition operation. A generation position of the reference signal is rendered constant by varying a reference voltage (Vr) depending on an output voltage of the exciter coil and an output frequency thereof.

19 Claims, 19 Drawing Sheets

5,584,280

1

IGNITION DEVICE OF CAPACITOR DISCHARGE TYPE FOR INTERNAL COMBUSTION ENGINE

TECHNICAL FIELD

This invention relates to an ignition device of the capacitor discharge type for an internal combustion engine which is adapted to control an ignition timing of an internal combustion engine by means of a microcomputer.

BACKGROUND ART

In general, an ignition device of the capacitor discharge type for an internal combustion engine includes a capacitor for accumulation of ignition energy which is arranged on a side of a primary winding of an ignition coil, a capacitor charging circuit for charging of the capacitor and a discharge switch which is turned on upon feeding of an ignition signal thereto to cause charges in the capacitor to be discharged to the primary winding of the ignition coil, wherein charges in the ignition energy accumulation capacitor are discharged to the primary winding of the ignition coil to cause a high voltage to be induced across a secondary winding of the ignition coil, resulting in ignition operation of the internal combustion engine being carried out.

Such an ignition device may be constructed in such a manner that a magneto mounted on the internal combustion engine is provided therein with an exciter coil, which acts as an ignition power supply to charge the ignition energy accumulation capacitor. In such construction, a rotation angle period during which the exciter coil generates an output voltage of a positive half cycle and that during which it generates an output voltage of a negative half cycle are defined to be a charge period and a non-charge period, respectively, so that the capacitor may be charged by means of an output voltage of the exciter coil obtained during the charge period.

In recent years, an internal combustion engine is requested to meet requirements such as purification of exhaust gas, an improvement in fuel consumption rate, a decrease in noise, an increase in output and the like. In order to meet the requirements, it is required to use a microcomputer to precisely control an ignition timing of the internal combustion engine in view of control conditions such as an engine speed and the like.

A device for controlling the ignition timing by means of a microcomputer is disclosed in, for example, Japanese Patent Application Laid-Open Publication No. 262366/1989. The device disclosed is adapted to control the ignition timing depending on a degree of opening of a throttle valve. Another device for the same purpose is disclosed in Japanese Patent Application Laid-Open Publication No. 163443/1989, which is constructed so as to control the ignition timing in view of both an engine speed and a degree of opening of a throttle valve.

In the following description, the ignition timing will be indicated by a rotation angle of an output shaft (normally, a crank shaft) of the internal combustion engine.

An ignition device for an internal combustion engine which is adapted to control an ignition timing of the internal combustion engine by means of a microcomputer is constructed so as to realize both an engine speed operation means for operating an engine speed or a rotational speed of the internal combustion engine and an ignition timing operation means for operating the ignition timing in view of the engine speed by means of the microcomputer to feed an ignition circuit with an ignition signal at an rotation angle corresponding to an ignition timing operated by the ignition timing operation means, to thereby carry out ignition operation of the engine. In order to ensure that the ignition device carries but such ignition operation, it is required that coincidence of a rotation angle of the crank shaft with the operated ignition timing is detected at every rotation of the engine.

In view of the foregoing, in the conventional ignition device, a predetermined rotation angle position of the crank shaft of the internal combustion engine is defined to be a reference position, so that an ignition timing of the engine at each engine speed is operated in the form of a length of time required when the engine rotates from the reference position to a rotation angle corresponding to the ignition timing. (Such a length of time will be referred to as "ignition timing measuring time" herein.) The microcomputer functions to set the operated ignition timing measuring time in, for example, a counter (or a timer) every time when the reference position is detected and generate an ignition signal when the counter completes measurement of the time set (or counting of clock pulses providing the ignition timing measuring time).

Thus, in an ignition device for internal combustion engine for controlling an ignition timing of the engine by means of a microcomputer, it is required to detect that a rotation angle position of a crank shaft of the engine coincides with a predetermined reference position. For this purpose, the conventional ignition device is provided with a signal generator (pulser) equipped with a rotor rotated in synchronism with the crank shaft of the engine and a signal generating element arranged opposite to the rotor, resulting in the signal generator generating a pulse for detecting the reference position. Various types of signal generators are known in the art. For example, when an internal combustion engine is mounted thereon with a flywheel, a signal generator is typically used which is constructed in such a manner that a peripheral wall of the flywheel on which a reluctor is formed acts as a rotor and a signal generating element is arranged opposite to the rotor. Also, another signal generator is used for this purpose, which is constructed in such a manner that a reluctor is provided on an outer periphery of a cylindrical boss arranged at a central portion of a flywheel in order to mount the flywheel on an internal combustion engine, to thereby permit the boss to act as a rotor and a signal generating element is arranged inside the flywheel so as to be opposite to the rotor. Further, when the magneto is constructed into a rotor inside-rotation type wherein a magnet rotor is rotated inside a stator, a rotor for signal generation which is separate from the magnet rotor is mounted on a revolving shaft of the engine while being opposite to the signal generating element.

Thus, in the conventional ignition device of the capacitor discharge type for the internal combustion engine constructed as described above, a pulse providing the reference position at which measuring of an ignition timing is started is generated by the signal generator. Unfortunately, this requires to mount the signal generator on the engine, leading to an increase in manufacturing cost. In particular, arrangement of the signal generating element on an outer periphery of the flywheel necessarily causes an increase in outer diameter of the magneto.

It would be considered that a reluctor is arranged on a boss of the flywheel while being rendered opposite to the signal generating element arranged inside the flywheel. However, such arrangement would cause a noise signal to occur due to a magnetic flux generated by a magnetic flied from a magnet of the magnet rotor of the flywheel, so that the noise signal thus produced leads to malfunction of the ignition device. In particular, when an exciter coil for inducing a high voltage necessary to charge the capacitor of the ignition circuit is provided on the magneto of the flywheel, the exciter coil is caused to be increased in size, to thereby substantially fail to provide a space required to arrange the signal generating element inside the flywheel.

It is an object of the present invention to provide an ignition device of the capacitor discharge type for an internal combustion engine which is capable of detecting a reference position at which measuring of an ignition timing of the internal combustion engine is initiated by means of an output of a magneto mounted on the internal combustion engine without any signal generator, to thereby eliminate various problems due to use of the signal generator.

DISCLOSURE OF INVENTION

An ignition device of the capacitor discharge type for an internal combustion engine according to the present invention comprises a magneto having at least an exciter coil for capacitor charging arranged on a side of a stator thereof and constructed so as to generate an AC voltage in synchronism with rotation of the internal combustion engine; an ignition energy accumulating capacitor arranged on a side of a primary winding of the ignition coil; a capacitor charging circuit for charging the ignition energy accumulating capacitor by means of an output voltage of said exciter coil in a charge period while defining a rotation angle period during which the exciter coil generates an output voltage of a positive half cycle and that during which it generates an output voltage of a negative half cycle as the charge period of the capacitor and a non-charge period of the capacitor, respectively; a discharge switch turned on when it is fed with an ignition signal, to thereby permit charges in the ignition energy accumulating capacitor to be discharged to the primary winding of the ignition coil; a reference signal generating circuit for generating a reference signal when a level of an output voltage of the magneto during the non-charge period coincides with a reference level of which a magnitude is varied depending on a variation in output voltage and output frequency of the magneto; an ignition timing operational means for operating an ignition timing at every rotational speed of the internal combustion engine; an ignition timing detection signal generating means for generating an ignition timing detection signal when measuring of the ignition timing operated by the ignition timing operational means is completed after the measuring is started at the time of generation of the reference signal; and a circuit for feeding the discharge switch with an ignition signal when the ignition timing detection signal is generated; wherein the reference level has a variation rate adjusted so that the reference signal is generated at a position rendered constant irrespective of a peak value of an output voltage of the magneto during the non-charge period and a frequency thereof.

The above-described reference signal generating circuit may be constituted by a voltage detection circuit for detecting an output voltage of the magneto during the non-charge period, a reference voltage generating circuit for generating a reference voltage varied in magnitude depending on a variation in output voltage and output frequency of the magneto during the non-charge period, and a reference signal output circuit for outputting a reference signal when an output voltage of the voltage detection coincides with the reference voltage. Also, the reference voltage generating circuit includes a reference voltage generating capacitor charged by an output voltage of the magneto during the non-charge period and a discharge resistor connected in parallel to the reference voltage generating capacitor and is constructed so as to generate a reference voltage across the reference voltage generating capacitor.

Alternatively, the reference signal output circuit may comprise a circuit including a reference signal generating switch constructed so as to operate when a level of an output voltage of the voltage detection circuit coincides with a level of the reference voltage in the course during which an output voltage of the magneto during the non-charge period is increased toward a peak value. In this instance, a variation in voltage across the reference signal generating switch occurring when the switch is operated is used as the reference signal.

Also, the reference signal output circuit may be constituted by a circuit including a reference level detection switch so constructed that a state exhibited by the switch when a level of an output voltage of the voltage detection circuit is equal to or below a level of the reference voltage is rendered different from a state exhibited by it when the former level exceeds the latter level and a level variation detection circuit for detecting a variation in voltage across the reference level detection switch occurring when a level of an output voltage of the voltage detection circuit coincides with a level of the reference voltage in the course during which a level of an output voltage of the magneto during the non-charge period is decreased past the peak value.

In the ignition device described above, during the charge period for which the ignition energy accumulating capacitor is charged by an output voltage of a positive half cycle of the exciter coil, a charging current flowing through the ignition energy accumulating capacitor causes a substantial armature reaction to occur in the magneto. The armature reaction thus produced causes a peak position of an output voltage of the magneto during the charge period to be moved. Also, it likewise causes a boundary position bet ween falling of an output voltage of a half cycle during the charge period and rising of an output voltage of a half cycle during the non-charge period to be moved. Thus, during the charge period of the magneto, a waveform of an output voltage thereof is varied with a variation in output of the magneto caused by a variation in rotational speed of the engine or engine speed, so that it is difficult to detect a constant reference position based on an output voltage of the magneto during the charge period.

On the contrary, during the non-charge period for which the ignition energy accumulating capacitor is not subject to charging, an armature reaction due to a charging current of the ignition energy accumulating capacitor does not occur, so that a waveform of an output voltage of the magneto during the non-charge period coincides with a waveform during no-load near a peak thereof at which an influence of an armature reaction during the charge period is extinguished. Therefore, a waveform of an output voltage of the magneto near a peak thereof during the non-charge period has constant relationship to a rotation angle position of the engine.

In view of the above, such construction as seen in the present invention wherein the reference voltage generating circuit for generating a reference voltage varied in level with a variation in output voltage and output frequency of the magneto during the non-charge period, the voltage detection circuit for detecting an output voltage of the magneto during the non-charge period and the reference signal output circuit for outputting a reference signal when a level of an output voltage of the voltage detection circuit coincides with a level of the reference voltage are arranged to adjust a variation rate of a level of the reference voltage to a suitable value permits a reference signal which is generated at a substantially constant position to be provided irrespective of both a peak value and a frequency of an output voltage of the magneto during the non-charge period, to thereby eliminate arrangement of any signal generator.

In the present invention, it is a matter of course that it is required to establish positional relationship between the rotor of the magneto and a stator thereof so that a reference signal generation position is suitable as a reference position at which measuring of an ignition timing is started (a maximum advanced position or a position advanced from the maximum advanced position).

In the ignition device constructed as described above, an ignition timing during steady operation of the engine is determined by an ignition timing detection signal generated from the microcomputer. When the microcomputer is driven by means of an output of a DC power circuit for rectifying an output of the magneto to provide a DC voltage, operation of the microcomputer is failed unless an output of the power circuit is established during starting operation of the engine. Therefore, when the ignition device is so constructed that the discharge switch is fed with an ignition signal only when the microcomputer generates an ignition timing detection signal, an engine speed during starting operation of the engine tends to be increased, resulting in starting characteristics of the engine being deteriorated.

Also, the above-described construction of the ignition device wherein the discharge switch is fed with an ignition signal only when the microcomputer generates an ignition timing detection signal leads to a disadvantage of causing ignition operation of the ignition device to be failed, resulting in a failure in operation of the engine, when the microcomputer is broken to fail in operation of the ignition timing. In particular, an ignition device for an internal combustion engine for a vehicle for marine applications, mountainous applications or the like such as an outboard motor, a snowmobile or the like causes a driver, an operator or the like to fail to go back when ignition operation of the ignition device is failed. Thus, it is required to eliminate a failure in ignition operation to the utmost.

In view of the above, the ignition device according to the present invention preferably further includes an OR circuit to which an ignition timing detection signal and a reference signal are inputted, a mask switch arranged so as to bypass the reference signal from the OR circuit when it is turned on, a mask switch drive means for turning on the mask switch when a rotational speed of the internal combustion engine is at a set level or above, so that an output of the OR circuit may fed in the form of an ignition signal to the discharge switch.

Such construction permits an ignition signal to be fed to the discharge switch when the reference signal generating circuit generates a reference signal, resulting in ignition operation being accomplished even during low speed operation of the engine which causes a failure in starting of operation of the microcomputer, to thereby ensure continuation of operation of the engine.

When an ignition signal is fed at a reference signal generation position during low speed operation of the engine as described above, an ignition timing of the engine during starting operation of the engine is advanced. This causes ignition to be carried out too early depending on an internal combustion engine, resulting in a phenomenon, that a piston is pushed back when the engine is started by rope starting or kick starting. In order to prevent such a phenomenon, it is preferable to delay an ignition timing of the engine during low speed operation of the engine as compared with a reference signal generation position.

For this purpose, it is preferable that the ignition device is so constructed that a reference signal is generated when a level of an output voltage of the voltage detection coincides with a level of the reference voltage and further includes a peak detection circuit for detecting a peak position of an output voltage of the magneto during the non-charge period to output a peak detection signal, an OR circuit to which an ignition timing detection signal and a peak detection signal are inputted, a mask switch arranged so as to bypass the peak detection signal from the OR circuit when it is turned on, and a mask switch trigger circuit for triggering the mask switch in a region in which a rotational speed of the internal combustion engine is at a set level or above, to thereby turn on it, resulting in an output of the OR circuit being fed in the form of an ignition signal to the discharge switch.

In this instance, a peak position of an output voltage of the magneto during the non-charge period is preferably set at a position which prevents the piston from being pushed back when ignition operation takes place at the peak position during starting of the engine. Also, the peak position is preferably set at a position which permits the engine to be operated while keeping ignition operation fixed at the peak position.

Such construction as described above permits an ignition signal to be fed at a position delayed from the reference position (a peak position of the output voltage during the non-charge period) when the microcomputer fails to operate the ignition timing, to thereby prevent the piston from being pushed back during starting of the engine.

The peak detection circuit described above may be constructed of, for example, a peak detection capacitor, a first peak detection transistor fed with a base current through the peak detection capacitor by an output of a negative half cycle of the exciter coil, resulting in being turned on, and a second peak detection transistor kept turned off when the first peak detection transistor is turned on and rendered turned on to output a fixed ignition timing signal when the first peak detection transistor is turned off.

Also, the present invention may include a reference voltage generating circuit for generating a reference voltage varied in level with a variation in output voltage and output frequency of the magneto during the non-charge period, a voltage detection circuit for detecting an output voltage of the magneto during the non-charge period, a reference signal/fixed ignition timing signal generating circuit for generating a reference signal when a level of an output voltage of the voltage detection circuit coincides with a level of the reference voltage in the course during which a level of an output voltage of the magneto during the non-charge period is increased toward a peak value and generating a fixed ignition timing signal when an output voltage of the voltage detection circuit-coincides with a level of the reference voltage in the course during which a level of an output voltage of the magneto during the non-charge period is decreased past the peak value, and an OR circuit to which the ignition timing detection signal and fixed ignition timing signal are inputted and which is adapted to provide the discharge switch with an ignition signal when either the ignition timing detection signal or the fixed ignition timing signal is generated. Also in this instance, a variation rate of a level of the reference voltage is so adjusted that a reference signal generation position is rendered constant irrespective of both a peak value and a frequency of an output voltage of the magneto during the non-charge period.

Such construction of the present invention likewise permits an ignition signal to be provided at a rotation angle position corresponding to the fixed ignition timing delayed from the reference position when the microcomputer fails to operate an ignition timing of the internal combustion engine, resulting in preventing the piston from being pushed back during starting of the engine by rope starting or kick starting.

Alternatively, in the present invention, the reference signal generating means may be constructed of a peak detection circuit to which an output voltage of the magneto during the non-charge period is inputted and which is adapted to generate a reference signal when a peak of the output voltage is detected.

Arrangement of the peak detection circuit for detecting a peak of an output voltage of the magneto during the non-charge period to generate a signal renders a generation position of an output of the peak detection circuit substantially constant irrespective of an engine speed. This permits an output of the peak detection circuit to be used as a reference signal, to thereby provide a reference signal for a basis of ignition timing measuring without using any signal generator.

In this instance, it is a matter of course that positional relationship between the rotor of the magneto and the stator thereof is set so as to ensure that a peak position of an output voltage of the magneto during the non-charge period is appropriately set (or normally set to be a maximum advanced position).

As described above, in order to ensure ignition operation when the microcomputer fails in operation also in the case of detecting a peak of an output voltage of the magneto during the non-charge period, the present invention preferably further includes an OR circuit to which the ignition timing detection signal and reference signal are inputted, a reference signal mask switch arranged so as to bypass the reference signal from the OR circuit when it is turned on, and a reference signal mask switch drive means for turning on the reference signal mask switch when a rotational speed of the internal combustion engine is at a set level or above.

Further, in the present invention, the magneto may be so arranged that a position at which a period of a half cycle of an output of the magneto during the non-charge period terminates is set so as to be delayed from a maximum advanced position of the internal combustion engine, wherein the present invention may further include a fixed ignition timing signal generating circuit for detecting a position at which a period of a half cycle of an output of the magneto during the non-charge period terminates to generate a fixed ignition timing signal and an OR circuit to which an ignition timing detection signal and a fixed ignition timing signal are inputted and which is adapted to provide the discharge switch with an ignition signal when either the ignition timing detection signal or the fixed ignition timing signal is generated.

Such construction permits an ignition timing during each of starting operation of the engine and low speed operation thereof to be delayed from the reference position, to thereby prevent the piston from being pushed back during starting of the engine.

The fixed ignition timing signal generating circuit may be constructed of, for example, a circuit including a waveform shaping circuit for shaping a waveform of an output of the magneto during the non-charge period to provide a rectangular-waveform signal and a differentiation circuit for detecting falling of the rectangular-waveform signal provided by the waveform shaping circuit to generate a pulse-like signal in the form of the fixed ignition timing signal.

Also, the fixed ignition timing signal generating circuit may be constructed of a circuit including a fixed ignition timing detection transistor turned on when it is fed with a drive signal by means of an output voltage of the magneto during the non-charge period and kept turned on during a period for which the output voltage during the non-charge period is generated and a differentiation circuit for differentiating a voltage across a collector-emitter circuit of the fixed ignition timing detection transistor. In this instance, a pulse signal generated from the differentiation circuit when the fixed ignition timing detection transistor is turned off is used as the fixed ignition timing signal.

The reference signal generating circuit adapted to detect a peak of an output of the magneto during the non-discharge period to generate a reference signal may be constructed of, for example, a circuit including a peak detection capacitor, a first peak detection transistor fed with a base current through the peak detection capacitor by means of a half-cycle output of the magneto during the non-discharge period, resulting in being turned on, and a second peak detection transistor kept turned off while the first peak detection transistor is turned on and rendered turned on to generate a reference signal when the first peak detection transistor is turned off.

Also, the present invention may be so constructed that an ignition timing when an engine speed is below a set level is provided by means of the ignition timing operational means. In this instance, the present invention may include a reference signal generating circuit for generating a reference signal at a reference position at which measuring of an ignition timing of the internal combustion engine is started; a boundary detection circuit for detecting a boundary between the charge period and the non-charge period to generate a boundary detection signal at the time of transition from the charge period to the non-charge period; a boundary detection time storage means for storing therein boundary detection signal generation time or time at which the boundary detection signal is generated; an ignition timing operational means for permitting the number of clock pulses to be counted during a period of time for which the internal combustion engine is rotated from a reference position to a rotation angle position corresponding to an ignition timing to be operated in the form of an ignition timing measuring counted value or a counted value for ignition timing measuring with respect to each rotational speed of the internal combustion engine when a rotational speed of the internal combustion engine is at a set level or above and permitting the ignition timing measuring counted value to be operated by multiplying a period of time extending from boundary detection signal generation time to reference signal generation time by a constant of 1 or less when the rotational speed is below the set level; and an ignition signal generating means for generating an ignition signal when a counted value of clock pulses of which counting is started at the time of generation of the reference signal coincides with the ignition timing measuring counted value. In this instance, the reference signal generation circuit may be constructed of a reference voltage generating circuit for generating a reference voltage of which a level is varied with a variation in output voltage and output frequency of the magneto during the non-charge period, a voltage detection circuit for detecting an output voltage of the magneto during the non-charge period, and a reference signal output circuit for outputting a reference signal when a level of an output voltage of the voltage detection circuit coincides with a level of the reference voltage.

The reference voltage generating circuit described above may be constructed of a circuit including a reference voltage generating capacitor charged by an output voltage of the magneto during the non-charge period and a discharge resistor connected in parallel to the reference voltage generating capacitor.

The reference signal output circuit described above may be constructed of a circuit which includes a reference signal generating switch operated when a level of an output voltage of the voltage detection circuit coincides with a level of the reference voltage in the course during which a level of an output voltage of the magneto during the non-charge period is increased toward a peak value and in which a variation in voltage across the reference signal generating switch occurring when the switch is operated is used as a reference signal.

Alternatively, the reference signal output circuit may be constituted by a circuit including a reference level detection switch so constructed that a state exhibited by the switch when a level of an output voltage of the voltage detection circuit is equal to or below a level of the reference voltage is rendered different from a state exhibited by it when the former level exceeds the latter level and a level variation detection circuit for detecting a variation in voltage across the reference level detection switch occurring when a level of an output voltage of the voltage detection circuit coincides with a level of the reference voltage in the course during which a level of an output voltage of the magneto during the non-charge period is decreased pasta peak.

The reference signal generating circuit described above may be constructed of a peak detection circuit for generating a reference signal when it detects a peak of an output voltage of the magneto during the non-charge period. In this instance, the peak detection circuit may be constituted by a peak detection capacitor, a first peak detection transistor turned on when it is fed with a base current through the peak detection capacitor by means of an output of a negative half cycle of the exciter coil, and a second peak detection transistor kept turned off while the first detection transistor is turned on and rendered turned on to generate a reference signal when the first peak detection transistor is turned off.

In the ignition device according to the present invention, the discharge switch normally comprises a thyristor. Alternatively, another switch such as a transistor, an FET or the like may be often used for this purpose.

In general, a "minimum advances position" used in the art is determined to be a substantially constant position depending on an internal combustion engine, whereas "a maximum advanced position" is varied depending on characteristics of an internal combustion desired, applications of the engine and the like. When an ignition timing of the engine is controlled by means of a microcomputer, the "maximum advanced position" can be suitably varied on a soft ware.

BEST MODES FOR CARRYING OUT INVENTION

Now, the present invention will be described hereinafter in connection with preferred embodiments thereof with reference to the accompanying drawings.

Figure 1:
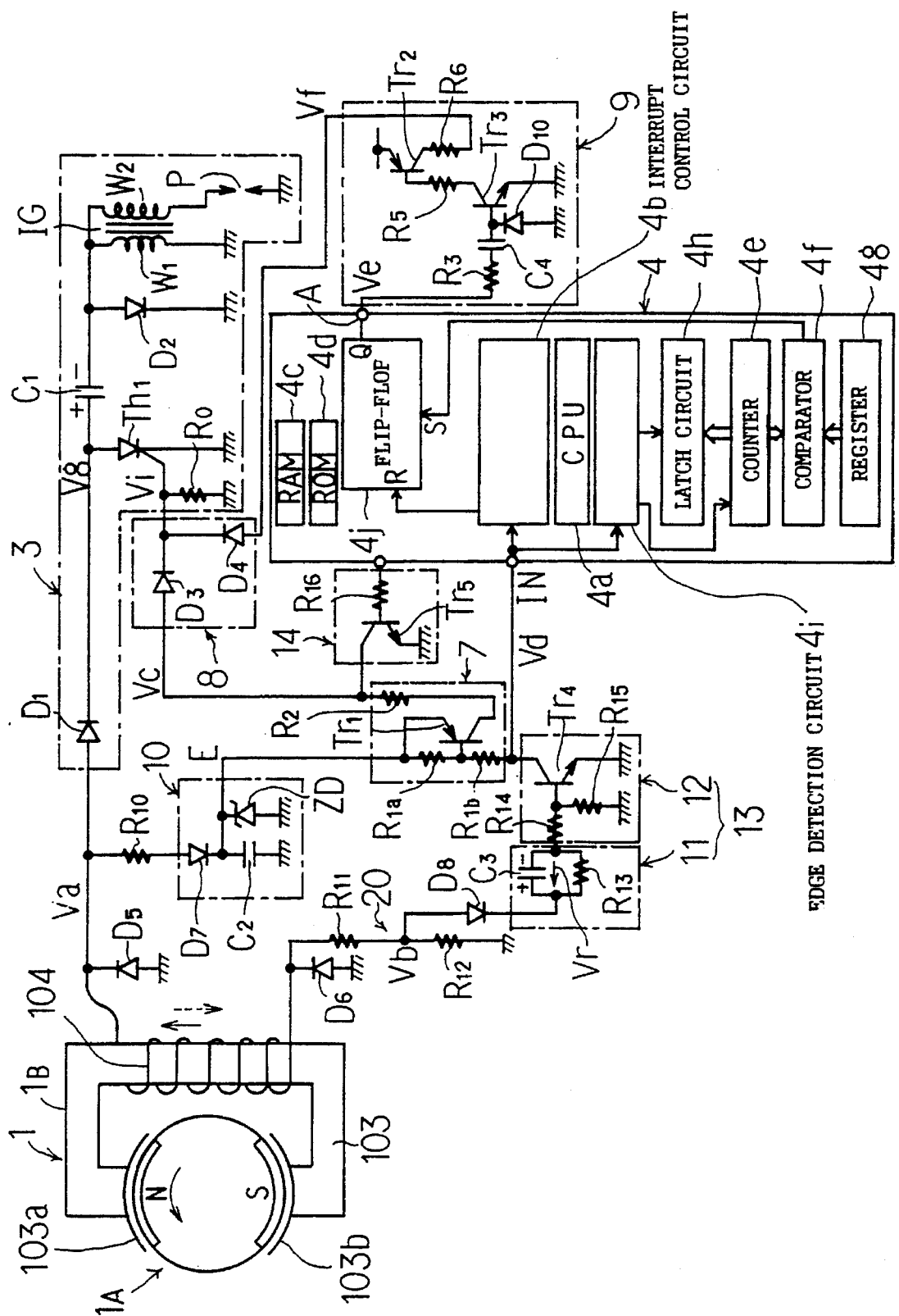
FIG. 1 is a circuit diagram showing an embodiment of the present invention.

Embodiment of FIG. 1.

FIG. 1 shows an embodiment of the present invention, wherein reference numeral 1 designates a magneto mounted on a crank shaft of an internal combustion engine, 3 is an ignition circuit of the capacitor discharge type, 4 is a microcomputer, 8 is an OR circuit including diodes D3 and D4, 9 is an ignition timing detection signal feed circuit for feeding the OR circuit 8 with an ignition timing detection signal generated by the microcomputer 4 (which indicates herein a signal generated by the microcomputer when an ignition timing operated is detected).

The magneto 1 incorporated in the embodiment includes a two-pole magnet rotor 1A of the inside-rotation type formed on an outer periphery thereof with two magnetic poles N and S at an angular interval of 180 degrees and a stator 1B including an iron core 103 having magnetic pole sections 103a and 103b arranged on both ends thereof so as to be opposite to the magnetic poles of the magnet rotor 1A and an exciter coil 104 wound on the iron core 103. The magnet rotor 1A is mounted on an output shaft of the internal combustion engine (not shown) and the exciter coil 104 has an AC voltage of one cycle per one rotation to be induced thereacross in synchronism with rotation of the engine.

The ignition circuit 3 of the capacitor discharge type includes an ignition coil IG, an ignition plug P, diodes D1 and D2, an ignition energy accumulation capacitor C1, a discharge thyristor Th1 and a resistor R0 as widely known in the art. The ignition coil IG includes a primary winding W1 of which one end is grounded and a secondary winding W2 of which one end is connected to a non-grounded terminal of the primary winding W1. The secondary winding W2 is connected at the other end thereof to a non-grounded terminal of the ignition plug P mounted on a cylinder of the engine. The primary winding W1 is connected at the other end thereof to one end of the ignition energy accumulation capacitor C1 and the thyristor Th1 is connected between the other end of the capacitor C1 and the ground in such a manner that a cathode thereof faces the ground. In the illustrated embodiment, the thyristor Th1 provides a discharge switch which is turned on when it is fed with an ignition coil, to thereby permit charges in the capacitor C1 to be discharged through the primary winding W1 of the ignition coil IG. The thyristor Th1 includes a gate-cathode circuit to which the resistor R0 is connected and the diode D2 is connected across the primary winding W1 in such a manner that a cathode thereof faces the ground. The diode D1 is connected at a cathode thereof to the other end of the capacitor C1 and at an anode thereof to one end of the exciter coil 104. Between the one end of the exciter coil 104 and the ground and between the other end of the exciter coil 104 and the ground are respectively connected diodes D5 and D6 each having an anode arranged so as to face the ground.

In the illustrated embodiment, a circuit including the exciter coil 104, diode D1, capacitor C1 and diode D2, as well as the primary winding of the ignition coil IG, the diode D6 and the exciter coil 104 provides a capacitor charging circuit. In the capacitor charging circuit, a rotation angle period during which the exciter coil 104 generates an output voltage of a positive half cycle is defined to be a charge period and that during which the exciter coil 104 generates an output voltage of a negative half cycle is defined to be a non-charge period, wherein an output voltage of the exciter coil during the charge period permits the capacitor C1 to be charged at a polarity shown in FIG. 1.

When the thyristor Th1 is fed at a gate thereof with an ignition signal Vi during an ignition timing, the thyristor is turned on, resulting in charges in the capacitor C1 being discharged through the thyristor Th1 and the primary winding W1 of the ignition coil. This permits a high voltage to be induced across the secondary winding W2 of the ignition coil, so that spark occurs at the ignition plug P, leading to ignition of the engine.

In the description herein, positive and negative polarities of an output of the magneto are defined to be relative to each other. Thus, when one of half cycles different in polarity of an output voltage generated by the magneto is defined to be a positive half cycle, the other is defined to be a negative one. Also, in the description, of both half cycles of an output generated by the exciter coil, a half cycle which is used for charging the ignition energy accumulating capacitor is defined to be a positive half cycle and a half cycle which is not used therefor is defined to be a negative half cycle.

Between the one end of the exciter coil 104 and the ground is also connected a DC power circuit 10 through a resistor R10. The power circuit includes a diode D7 of which an anode is connected through the resistor R10 to the one end of the exciter coil 104, a power capacitor C2 connected between a cathode of the diode D7 and the ground, and a Zener diode ZD connected across the capacitor C2. The power capacitor C2 is charged through the resistor R10 and diode D7 when the exciter coil 104 induces an output voltage of a positive half cycle in a direction indicated at an arrow of a solid line in FIG. 1. A voltage across the capacitor C2 is restricted by a Zener voltage of the Zener diode ZD. A DC voltage E induced across the capacitor C2 is used as a DC power supply voltage for each of sections of the ignition device of the illustrated embodiment. The resistor R10 has a resistance value set to a level high sufficiently to permit a current flowing from the exciter coil 104 to the power circuit 10 to be restricted to an amount which ensures charge of the ignition energy accumulating capacitor.

Between the other end of the exciter coil 104 and the ground is connected a voltage dividing circuit comprising a series circuit of resistors R11 and R12. To a connection between the resistors R11 and R12 (which is an output terminal of the voltage dividing circuit) is connected an anode of a diode D8, of which a cathode is connected to one end of a reference voltage generating circuit 11 comprising a parallel circuit of a reference voltage generating capacitor C3 and a discharge resistor R13. The reference voltage generating circuit 11 is connected at the other end thereof through a resistor R14 to a base of an NPN transistor Tr4 of which an emitter is grounded. A base-emitter circuit of the transistor Tr4 has a resistor R15 connected thereto.

In the illustrated embodiment, the voltage dividing circuit constructed of the resistors R11 and R12 and the diodes D5 and D8 cooperate with each other to provide a voltage detection circuit 20 for detecting an output voltage of the magneto during the non-charge period. Also, the transistor Tr4 and the resistors R14 and R15 cooperate with each other to provide a reference signal generating switch, which then provides a reference signal output circuit 12. Further, the above-described voltage detection circuit 20, reference voltage generating circuit 11 and reference signal output circuit 12 cooperate with each other to provide a reference signal generating circuit 13. The reference signal generating circuit 13 generates a reference signal Vd, which is fed in the form of an interruption signal IN to the microcomputer 4 and inputted in the form of a fixed ignition timing signal (which is an ignition timing signal generated at a constant rotation angle position irrespective of a rotational speed of the engine) through an inverter (inversion circuit) 7 constructed of a transistor Tr1 and resistors R1a, R1b and R2 to the OR circuit 8.

The transistor Tr1 of the inverter 7 is connected at an emitter thereof to an output terminal of the power circuit 10, resulting in being turned on to feed the fixed ignition timing signal from the power circuit 10 through the transistor Tr1 and resistor R2 to an anode of the diode D3 of the OR circuit 8 when the transistor Tr4 of the reference signal generating circuit is turned on.

Also, the anode of the diode D3 of the OR circuit 8 is connected to a collector of an NPN transistor Tr5 constituting a mask switch, of which an emitter is grounded. The transistor Tr5 is connected at a base thereof through a resistor R16 to a predetermined output port of the microcomputer 4. In the illustrated embodiment, the transistor Tr5 providing the mask switch and the resistor R16 cooperate with each other to provide a fixed ignition timing signal mask circuit 14.

The ignition timing detection signal circuit 9 is constructed of a PNP transistor Tr2, an NPN transistor Tr3, resistors R3 to R6, a capacitor C4 and a diode D10. The transistor Tr2 is connected at an emitter thereof to the output terminal of the DC power circuit 10 and at a base thereof through the resistor R5 to a collector of the transistor Tr3. The transistor Tr3 has an emitter grounded and the diode D10 is connected between a base of the transistor Tr3 and the ground in such a manner that an anode thereof faces the ground. The base of the transistor Tr3 is connected through the capacitor C4 and resistor R3 to an output port A of the microcomputer 4 and the collector of the transistor Tr2 is connected through the resistor R6 to an anode of the diode D4 of the OR circuit 8. The capacitor C4 functions as a differentiation element, to thereby cause the ignition timing detection signal fed through the transistor Tr2 to the ignition circuit 3 to have a pulse-like waveform.

The microcomputer 4 includes a CPU 4a, an interrupt control circuit 4b, a random access memory (RAM) 4c, a read-on memory (ROM) 4d, a counter 4e, a comparator 4f, a register 4g, a latch circuit 4h, an edge detection circuit 4i and a flip-flop circuit 4j. The microcomputer 4 carries out operation when it is fed with a power supply voltage from the power circuit 10.

Such construction of the illustrated embodiment wherein the power circuit which generates a DC voltage while using the magneto as a power supply therefor drives the microcomputer permits an ignition device for an internal combustion engine for a vehicle which is not mounted with a battery to be precisely controlled by means of the microcomputer.

In the illustrated embodiment, when the crank shaft of the engine is revolved, the exciter coil 104 generates an output voltage of a positive half cycle in a direction indicated at an arrow of a solid line in FIG. 1 during the charge period, as well as an output voltage of a negative half cycle in a direction indicated at an arrow of broken lines during the non-charge period. When the exciter coil 104 generates the output voltage of the positive half cycle, the ignition energy accumulating capacitor C1 is charged through the diodes D1 and D2 and the primary winding W1 of the ignition coil.

Figure 9:
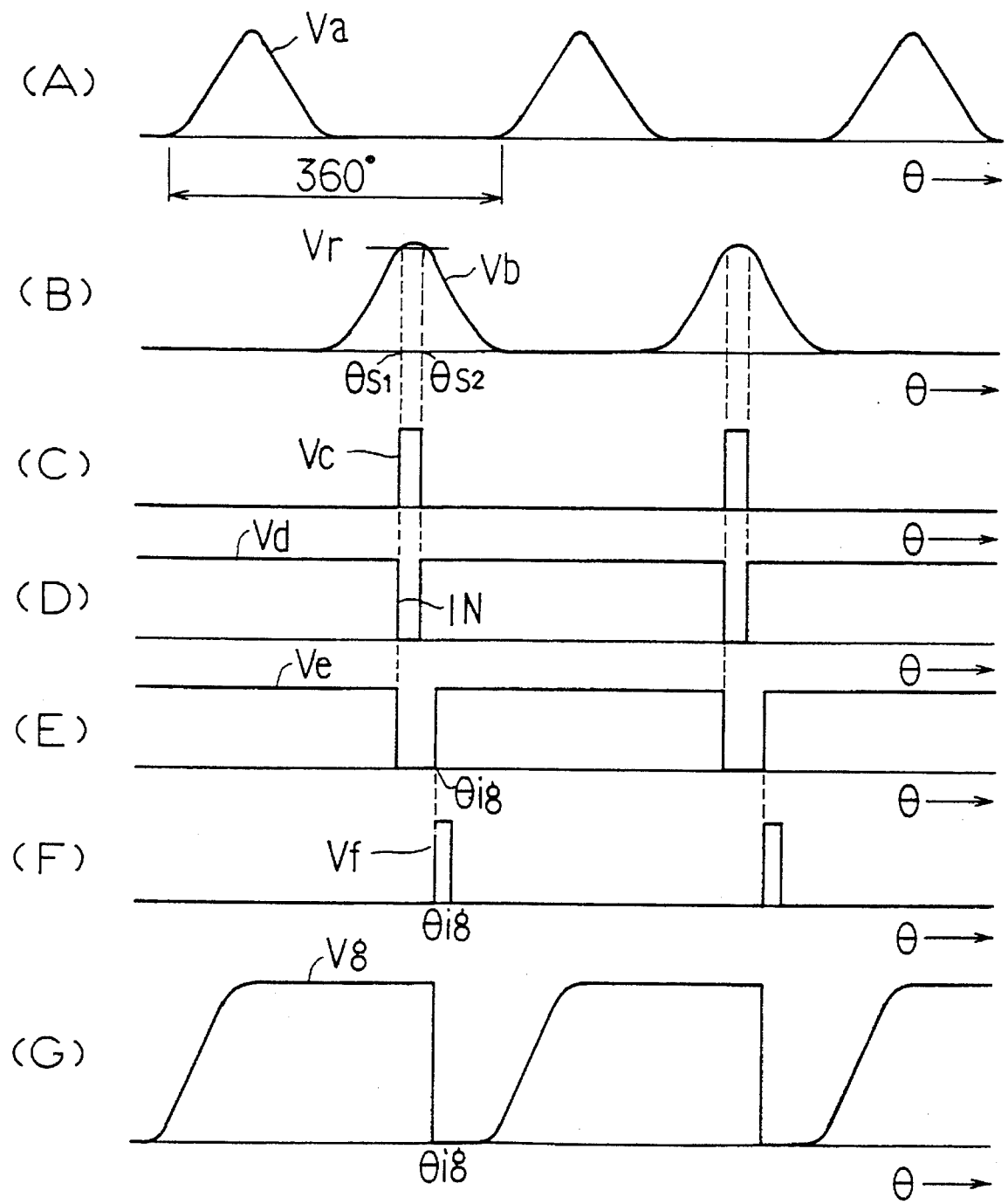
FIG. 9 is a waveform chart showing a signal a teach sections of the embodiment shown in FIG. 1.

In the embodiment shown in FIG. 1, relationship between a waveform of a voltage Va between the anode of the diode D1 and the ground during a no-load period and a rotation angle $\Theta$ of the output shaft of the engine is shown in (A) of FIG. 9 and a waveform of a voltage Vg across the ignition energy accumulating capacitor C1 is shown in (G) of FIG. 9. When the discharge thyristor Th1 is provided at the gate thereof with an ignition signal Vi after the capacitor C1 is charged, the thyristor is turned on to cause charges in the capacitor C1 to be discharged to the primary winding of the ignition coil IG, resulting in ignition operation being accomplished.

When the exciter coil 104 generates an output voltage of a negative half cycle during the non-charge period during which charging of the capacitor C1 does not take place, such an output voltage Vb as shown in FIG. 9(B) is induced at a voltage diving point of the voltage dividing circuit comprising the resistors R11 and R12. The voltage Vb is then fed in the form of an output voltage of the voltage detection circuit 20 for detecting an output voltage of the magneto during the non-charge period through the diode D8 to the reference voltage generating circuit 11, so that the capacitor C3 of the reference voltage generating circuit 11 may be charged by means of the voltage Vb. Charges in the capacitor C3 are discharged at a constant time constant through the resistor R13. A level of a voltage across the capacitor C3 is increased with an increase in output frequency of the magneto (or an increase in rotational speed of the engine) and with an increase in output voltage of the magneto. In the illustrated embodiment, a voltage across the capacitor C3 acts as a reference voltage Vr. A variation rate of the reference voltage Vr may be suitably adjusted by means of a resistance value of the resistor R13 and an electrostatic capacity of the capacitor C3.

When a detected value Vb of the output voltage of the magneto during the non-charge period (which, in the illustrated embodiment, is an output voltage of a negative half cycle of the exciter coil 104) is kept equal to or below a reference voltage Vr induced across the capacitor C3, the transistor Tr4 is not fed with a base current to keep the transistor Tr4 turned off, so that a voltage at a collector of the transistor Tr4 is kept at a high level. When an output voltage Vb of the voltage detection circuit 20 is rendered equal to a voltage (reference voltage) Vr across the capacitor C3 or more at a position of an angle $\Theta s1$ in the course during which an output voltage of a negative half cycle of the exciter coil is increased toward a peak value, the transistor Tr4 is fed with a base current, resulting in being turned on, so that a potential at the collector of the transistor Tr4 is varied from a high level to a low level (which is substantially a level of a ground potential). Also, when the voltage Vb coincides with the reference voltage Vr at a position of an angle $\Theta s2$ in the course during which an output voltage of a negative half cycle of the exciter coil is decreased past the peak value, the transistor Tr4 is turned off. This results in a potential at the collector of the transistor Tr4 being varied with respect to a rotation angle $\Theta$ as shown in (D) of FIG. 9

More Specifically, it is when the voltage Vb exceeds the reference voltage Vr that the transistor Tr4 is actually turned on in the course during which the voltage Vb is increased. However, the transistor Tr4 is turned on when the voltage Vb even slightly exceeds a reference voltage Vf, so that a position at which the transistor Tr4 is turned on may be regarded to be a position at which the voltage Vb coincides with the reference voltage Vf. Likewise, a position at which the transistor Tr4 is turned off in the course during which the voltage Vb is decreased from the peak may be regarded to be a position at which the voltage Vb coincides with the reference voltage Vf.

When a resistance value of the resistor R13 of the reference voltage generating circuit 11 and an electrostatic capacity of the capacitor C3 are suitably adjusted to appropriately adjust a variation rate of the reference voltage Vr with respect to a variation in output voltage and output frequency of a negative half cycle of the exciter coil, a position $\Theta s1$ at which a level of an output voltage Vb of the voltage detection circuit 20 coincides with a level of the reference voltage Vr in the course during which a level of an output voltage of a negative half cycle of the exciter coil is increased toward a peak value may be rendered substantially constant and a position $\Theta s2$ at which a level of the voltage Vb coincides with a level of the reference voltage Vr in the course during which a level of an output voltage of a negative half cycle of the exciter coil is decreased past the peak may be rendered substantially constant.

Thus, in the present invention, a variation rate of the reference voltage Vr is so adjusted that a position ($\Theta s1$ or $\Theta s2$) at which a detected value Vb of an output voltage of the magneto during the non-charge period coincides with a level of the reference voltage Vr is rendered constant, so that the constant position $\Theta s1$ or $\Theta s2$ is used as a reference position. Either the position $\Theta s1$ or the position $\Theta s2$ may be used as the reference position. In the illustrated embodiment, the position $\Theta s1$ at which a level of the output voltage Vb coincides with a level of the reference voltage in the course during which a level of an output voltage of a negative half cycle of the exciter coil is increased toward a peak value is defined to be the reference position. The illustrated embodiment is so constructed that the microcomputer recognizes a decrease in potential at an input port of the microcomputer as a signal (a negative logic signal), so that a decrease in potential at the collector of the transistor Tr4 occurring at the reference position Θs1 is inputted in the form of an external interrupt signal IN directly to the interrupt control circuit 4b and edge detection circuit 4i of the microcomputer.

In the illustrated embodiment, the transistor Tr4 incorporated is constructed so as to exhibit sensitivity of a level increased to a degree sufficient to permit the reference signal generating circuit 13 to carry out operation at a power supply voltage substantially lower than a power supply voltage required for driving the microcomputer.

When the interrupt control circuit 4b is fed with an interrupt signal IN, the flip-flop circuit 4j is reset, resulting in an output of a positive logic output terminal Q of the circuit 4j being rendered "0", so that a potential at the output port A of the microcomputer is rendered "0". Also, when the interrupt signal IN is generated, the edge detection circuit 4i detects falling of the signal to operate the latch circuit 4h. This results in the latch circuit 4h latching a value counted by the counter 4e when the interrupt signal IN is generated. The interrupt control circuit 4b permits the latch circuit 4h to latch the counted value of the counter 4e and clears the counter 4e. The counter 4e is thus cleared immediately after the counted value of the counter 4e is latched, so that the counted value latched corresponds to a period of time required for one rotation of the engine. The counted value per se or an engine speed operated on the basis of the counted value is used as data indicating a rotational speed Ne of the engine.

Figure 10:
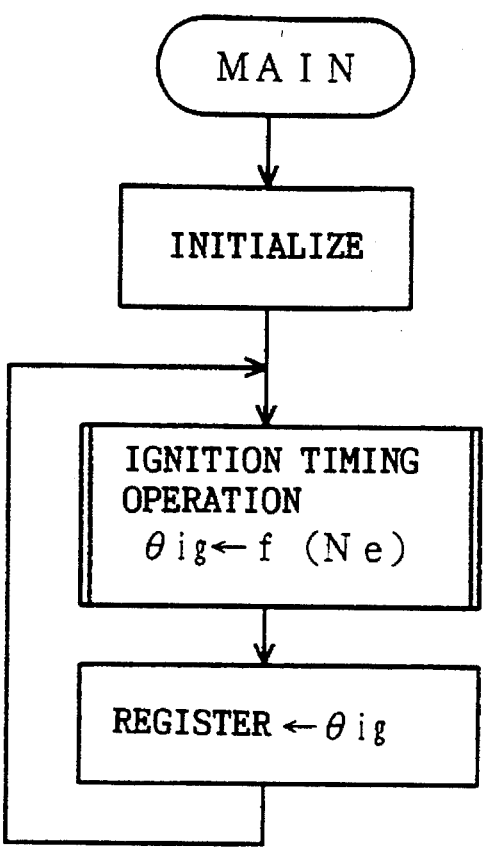
FIG. 10 is a flow chart showing an algorithm of a main routine executed by a microcomputer in an embodiment of the present invention.
Figure 11:
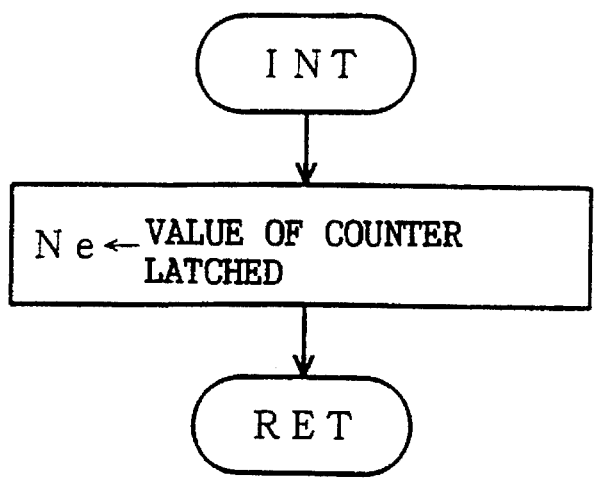
FIG. 11 is a flow chart showing an algorithm of an interruption routine executed by a microcomputer in an embodiment of the present invention.

The ROM 4d of the microcomputer has a predetermined program and a map used for operation of an ignition timing stored therein, so that a main routine shown in FIG. 10 and an interrupt routine shown in FIG. 11 take place by means of the program.

In the main routine shown in FIG. 10, a process wherein initialization of each section is initially carried out when the power supply is established, an ignition timing Θig at each rotational speed Ne is operated and then the ignition timing Θig thus operated is stored in the register is repeated. An operation of the ignition timing is carried out by means of the map stored in the ROM 4d. The map stored in the ROM 4d provides relationship between an ignition timing and a rotational speed at each of bend points (map points) of a polygonal line in a polygonal line graph showing relationship between the rotational speed and the ignition timing, wherein the ignition timing is operated by interpolation by means of data on the rotational speed and map stored in the RAM 4c. Data on the ignition timing are operated in the form of a period of time (an ignition timing measuring time) required when the engine is rotated from the reference position to a rotation angle position corresponding to the ignition timing. The data providing the ignition timing are stored in the register 4g. A process in which the ignition timing is operated realizes an ignition timing operational means.

When the interrupt control circuit 4b is fed with an interrupt signal IN, interrupt processing shown in FIG. 11 takes place, so that a rotational speed of the engine is operated on the basis of the counted value of the counter latched by the latch circuit 4h (which is a period of time required for one rotation of the engine). The rotational speed Ne operated is stored in the RAM 4c and then the operation is returned to the main routine. Data on the rotational speed Ne stored in the RAM 4c are used for an operation of the ignition timing.

The comparator 4f constantly carries out comparison between the counted value of the counter 4e (a length of time elapsed from time at which the reference position is detected) and contents of the register 4g, so that when the counted value of the counter coincides with the contents of the register at a rotation angle position corresponding to the ignition timing Θig, the comparator 4f provides a set terminal S of the flip-flop circuit 4j with a set signal.

When the flip-flop circuit 4j is thus fed with a set signal, a signal Ve at the output port A of the microcomputer 4 is varied from a state "0" to a state "1", resulting in an ignition timing detection signal being generated. This causes the transistor Tr3 to be fed with a base current through the resistor R3 and capacitor C4 for a short period of time, to thereby render the transistor Tr3 temporally turned on, leading to turning-on of the transistor Tr2, resulting in the OR circuit 8 being fed with an ignition timing detection signal Vf of a pulse-like waveform from the power circuit 10 through the transistor Tr2 as shown in (F) of FIG. 9. Thus, an ignition signal Vi is fed to the discharge thyristor Th1 of the ignition circuit 3 at an angle Θig corresponding to the ignition timing, so that ignition operation may be accomplished.

During a period for which a rotational speed of the engine is decreased to fail to permit an output voltage of the power circuit 10 to be established, the microcomputer 4 fails to operate, so that an ignition timing detection signal is not generated. Under the conditions, the transistor Tr4 of the reference signal generating circuit 13 (which is a reference signal generating switch) is turned on, (resulting in a reference signal Vd being generated;) so that when the transistor Tr1 of the inverter 7 is turned on, the OR circuit 8 is fed with a fixed ignition timing signal, resulting in the discharge thyristor Th1 being fed with an ignition signal Vi through the OR circuit 8. Thus, ignition operation takes place at a position at which the reference signal Vd is generated when a rotational speed of the engine is reduced to a degree sufficient to fail to permit the microcomputer to operate.

In the illustrated embodiment, a program for operating the microcomputer contains a program for realizing a mask switch trigger means for triggering the transistor Tr5 constituting a mask switch to turn on the transistor Tr5 when a rotational speed of the internal combustion engine is at a set level or above. The set level may be, for example, 2000 rpm. When a rotational speed of the engine is at the set level or above, the transistor Tr5 constituting the mask switch is turned on to bypass a fixed ignition timing signal fed to the OR circuit 8 from the 0R circuit, to thereby keep an ignition signal from being fed to the ignition circuit based on the fixed ignition timing signal. Therefore, when a rotational speed of the engine is kept at the set level or above, an ignition signal is provided at a rotation angle position corresponding to an ignition timing. Also, even when a rotational speed of the engine is kept below the set level, ignition operation is carried out at an ignition timing detection signal generation position when the ignition timing detection signal generation position is advanced from a position of generation of a fixed ignition timing signal (which, in the illustrated embodiment, is a reference signal).

Also, when the microcomputer 4 is broken to fail in operation, the fixed ignition timing signal mask circuit 14 fails in operation; so that the ignition circuit 3 is fed with an ignition signal at the reference signal generation position even when a rotational speed of the engine exceeds the set level. Thus, the engine may be operated even when the microcomputer is broken.

In the illustrated embodiment, a differentiation circuit is constructed by inserting the capacitor 4 into a base circuit of the transistor Tr3 of the ignition timing detection signal feed circuit 9, so that the OR circuit 8 is fed with only a pulse-like signal when an output of the flip-flop circuit 4j is at a state "1". Thus, reset ting of the flip-flop circuit 4j may be carried out at any desired position until a next reference signal is generated. In the illustrated embodiment, resetting of the flip-flop circuit 4j is carried out by means of an external interrupt signal IN. Alternatively, it may be carried out at any suitable position by means of a software.

For the purpose of providing a reference signal by means of a waveform of an output voltage of the magneto, it would be considered to detect a boundary position between falling of an output of a positive half cycle of the exciter coil and rising of a negative half cycle thereof (which is a point at which the positive half cycle is ended and the negative half cycle is started). Unfortunately, such construction fails to render the reference position constant as described hereinafter.

Figure 7:
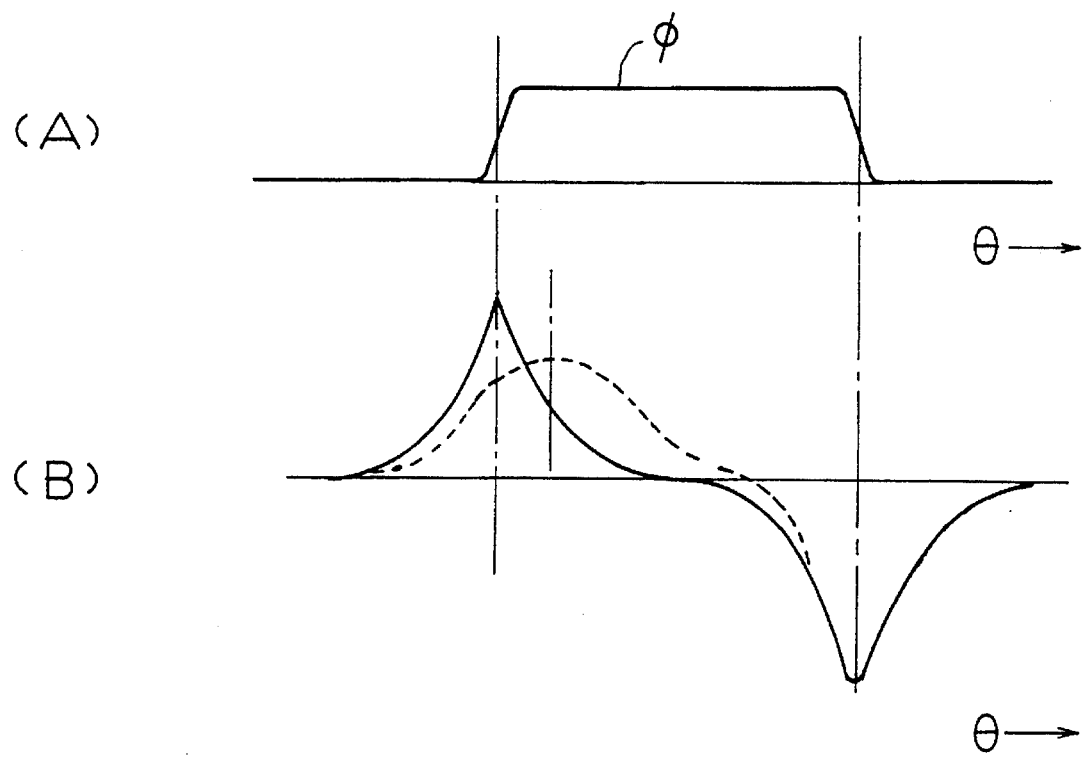
FIG. 7 is a waveform chart showing a magnetic flux interlinking an exciter coil and a voltage induced across the exciter coil.

(A) of FIG. 7 shows a waveform of a magnetic flux $\phi$ interlinking the exciter coil 104 with respect to a rotation angle $\Theta$ of the engine, and a no-load voltage induced across the exciter coil 104 due to a variation of the magnetic flux has such a waveform as indicated at a solid line in (B) of FIG. 7. When the ignition energy accumulating capacitor is charged by means of a positive half cycle of the exciter coil 104, an armature reaction occurs due to a charging current for charging of the capacitor, so that an output voltage of the exciter coil has such a waveform as indicated at broken lines in (B) of FIG. 7, wherein a peak of the waveform and a boundary position between falling of a positive half cycle thereof and rising of a negative half cycle thereof are delayed. When an increase in output voltage of the exciter coil with an increase in engine speed leads to an increase in charging current for the ignition energy accumulating capacitor, an armature reaction is increased; so that a peak of an output voltage of a positive half cycle of the exciter coil and a delay in boundary position between falling of the positive half cycle and rising of a negative half cycle are increased with an increase in engine speed. Thus, it is not proper to use a peak position of an output of a positive half cycle of the exciter coil and a boundary position between falling of the positive half cycle and rising of the negative half cycle as the reference position.

Figure 8:
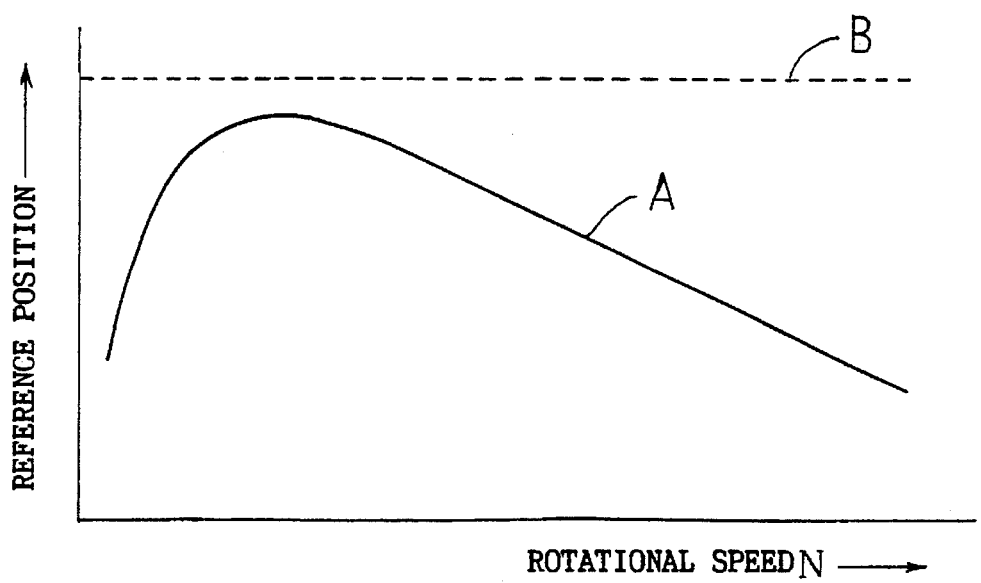
FIG. 8 is a diagrammatic view showing characteristics of a variation of a reference position to an engine speed when the reference position is determined utilizing a boundary position between falling of a positive half cycle of an exciter coil and rising of a negative half cycle thereof and those when the reference position is determined utilizing a peak position of negative half cycle of the exciter coil while comparing both with each other.

Also, it would be considered that a position at which an output voltage of a positive half cycle of the exciter coil 104 reaches a predetermined reference level is defined to be the reference position. However, rising of an output voltage of a positive half cycle of the exciter coil is delayed with an increase in armature reaction, therefore, such construction fails to render the reference position constant. A curve (a) in FIG. 8 indicates a variation of the reference position to an engine speed N when a boundary position between falling of a positive half cycle of the exciter coil 104 and rising of a negative half cycle thereof is defined to be the reference position.

On the contrary, charging of the ignition energy accumulating capacitor is not carried out during a negative half cycle of the exciter coil; so that a decrease in load of the exciter coil during the negative half cycle to the utmost permits a waveform of an output voltage of a negative half cycle of the exciter coil 104 to coincide with a waveform thereof during a no-load period in the course during which a level of the output voltage is increased toward a peak value. Thus, a variation rate of a level of the reference voltage Vr is suitably set, so that when a position at which a level of an output voltage of a negative half cycle of the exciter coil coincides with a predetermined reference position is defined to be the reference position, the reference position is rendered substantially constant irrespective of an engine speed N as indicated at a curve (b) of broken lines in FIG. 8.

Figure 2:
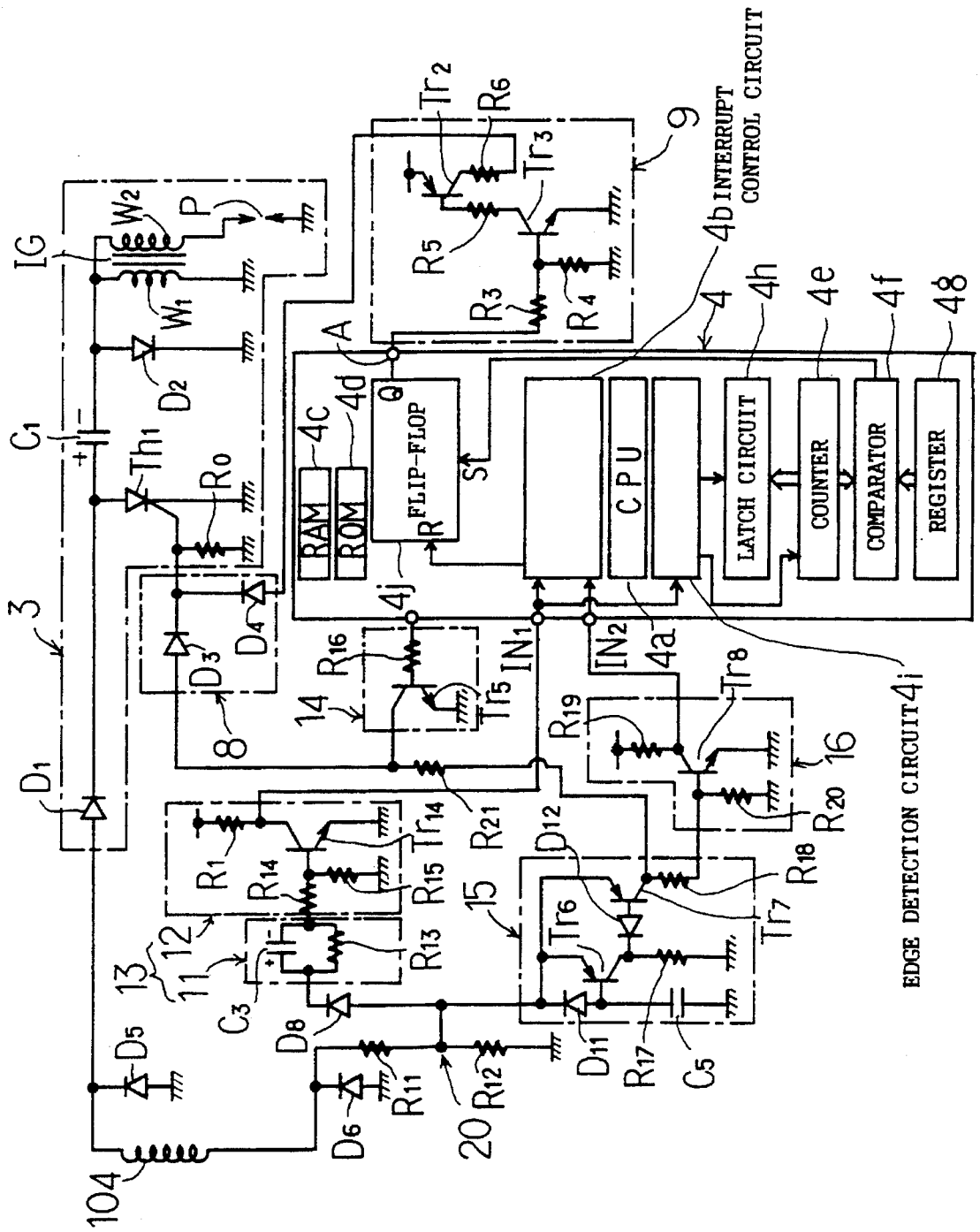
FIGS. 2 to 6 each are a circuit diagram showing another embodiment of the present invention.

Embodiment of FIG. 2

The embodiment of FIG. 1 is so constructed that a fixed ignition timing signal provided by inverting a reference signal through the inverter 7 is input ted to the OR circuit 8, to thereby provide an ignition signal used when the microcomputer fails to operate. However, such construction requires to generate the reference signal at a maximum advanced position; so that when a fixed ignition timing signal is to be provided by the reference signal, an ignition timing during starting of the engine is too early, resulting in a phenomenon that a piston of the engine is pushed back when the engine is started by rope starting or kick starting. An embodiment of FIG. 2 is constructed so as to eliminate such a disadvantageous phenomenon and includes a peak detection circuit 15 for detecting a peak position of an output voltage of a negative half cycle of an exciter coil (which is an output voltage thereof during a non-charge period) to generate a peak detection signal and an interrupt signal output circuit 16 for outputting an interrupt signal IN2 for resetting a flip-flop circuit 4j when the peak detection signal is generated.

The peak detection circuit 15 includes first and second peak detection transistors Tr6 and Tr7, a peak detection capacitor C5, diodes D11 and D12, and resistors R17 and R18. The interrupt signal output circuit 16 includes a transistor Tr8 and resistors R19 and R20.

More particularly, the transistors Tr6 and Tr7 each have an emitter connected to a connection between the resistors and R12 and the diode D11 is connected to an emitter-base circuit of the transistor Tr6. The capacitor C5 is connected between a base of the transistor Tr6 and the ground and the resistor R17 is connected between a collector of the transistor Tr6 and the ground. Also, the transistor Tr7 has a base connected through the diode D12 to the collector of the transistor Tr6 and has a collector connected to one end of the resistor R18. The resistor R18 is connected at the other end thereof to a base of the NPN transistor Tr8 of which an end is grounded and the resistor R20 is connected between the base of the transistor Tr8 and the ground. The transistor Tr8 is connected at a collector thereof through the resistor R19 to an output terminal of a power circuit (not shown in FIG. 2), as well as to an input terminal of an interrupt control circuit 4b of a microcomputer 4 through a predetermined input port of the microcomputer 4. The second peak detection transistor Tr7 of the peak detection circuit 15 is connected at the collector thereof through a resistor R21 to an anode of a diode D3 of an OR circuit 8.

The illustrated embodiment likewise includes a reference signal generating circuit 13 constructed of a reference voltage generating circuit 11 and a reference signal output circuit 12 as in the embodiment of FIG. 1, wherein the reference signal output circuit 12 includes a transistor Tr4 of which a collector is connected through a predetermined input port of the microcomputer to the input terminal of the interrupt control circuit 4b. The remaining part of the illustrated embodiment may be constructed in substantially the same manner as the embodiment of FIG. 1. The power circuit (now shown in FIG. 2) incorporated in the illustrated embodiment may be constructed in substantially the same manner as that shown in FIG. 1. Also, in the illustrated embodiment, the capacitor C4 and diode D10 incorporated in the embodiment of FIG. 1 are omitted from an ignition timing detection signal feed circuit 9.

In the embodiment of FIG. 2 thus constructed, when an exciter coil 104 generates an output voltage of a negative half cycle, a voltage Vb appears at a voltage dividing point of a voltage dividing circuit comprising the resistors R11 and R12, to thereby permit a current to flow through the emitter and base of the first peak detection transistor Tr6 and the peak detection capacitor C5. During flowing of the current, the transistor Tr6 is kept turned on, during which the transistor Tr7 is kept turned off. When an output voltage of a negative half cycle generated by the exciter coil 104 reaches a peak, charging of the capacitor C5 is completed to interrupt flowing of a base current to the transistor Tr6, to thereby turn off the transistor Tr6 and turn on the transistor Tr7. This results in a peak detection signal being outputted from the exciter coil 104 through the transistor Tr7 and then inputted in the form of a fixed ignition timing signal to the diode D3 of the OR circuit 8. Thus, it will be noted that in the illustrated embodiment, a peak detection signal provided by the peak detection circuit 15 when the microcomputer is kept from operating permits a discharge thyristor Th1 to be fed with an ignition signal.

Also, when the transistor Tr7 is tuned on at a peak position of an output voltage of a negative half cycle of the exciter coil, the transistor Tr8 of the interrupt signal output circuit 16 is turned off, resulting in a potential at the collector thereof being reduced, so that the interrupt control circuit 4b of the microcomputer is fed with an interrupt signal IN2. The interrupt signal thus fed causes the flip-flop circuit 4j to be reset.

Also, the transistor Tr4 is turned on when a level of an output voltage Vb of a voltage detection circuit 20 coincides with a level of a reference voltage Vr in the course during which an output voltage of a negative half cycle of the exciter coil is increased, resulting in a potential at the collector thereof being reduced, as in the embodiment of FIG. 1. Such a decrease in potential at the collector of the transistor Tr4 (reference signal) is fed in the form of an external interrupt signal IN1 to the microcomputer.

In the embodiment of FIG. 2, when the interrupt control circuit 4b is fed with an interrupt signal IN2, the flip-flop circuit 4j is reset, resulting in an output at a positive logic output terminal Q thereof being "0". Also, when an interrupt signal IN1 is generated, an edge detection circuit 4i detects falling of the signal to operate a latch circuit 4h, so that a value counted by a counter 4e when the interrupt signal IN1 is generated is latched and the counter 4e is cleared. The counter counts clock pulses, so that the counted value latched corresponds to a length of time required for one rotation of the engine. The counted value is used to operate an engine speed or a rotational speed of the engine, and the engine speed thus operated is stored in a RAM 4c. The engine speed thus stored and data on a map stored in a ROM are used to operate an ignition timing, so that data on the ignition timing operated are stored in a register 4g. A comparator 4f constantly carries out comparison between a counted value of the counter 4e and contents of the register 4g, so that when the counted value of the counter 4e coincides with the contents of the register 4g, a set terminal S of the flip-flop circuit 4j is fed with a set signal. When the flip-flop circuit 4j is thus fed with a set signal, a signal at an output port A of the microcomputer 4 is varied from "0" to "1", so that the transistor Tr3 is fed with a base current, resulting in being turned on. This leads to turning-on of a transistor, so that the OR circuit 8 is fed with an ignition timing detection signal from a power supply (not shown) through the transistor Tr2. This causes the discharge thyristor Th1 of an ignition circuit 3 to be fed with an ignition signal Vi, resulting in ignition operation being accomplished.

The above-described construction of the embodiment of FIG. 2 permits an ignition signal to be provided at a peak position of an output voltage of a negative half cycle of the exciter coil 104 which is delayed from a reference signal generation position when the microcomputer fails in operation, so that setting of an peak position of an output voltage of a negative half cycle of the exciter coil 104 at a position suitable for starting of the engine permits starting of the engine to be smoothly carried out by rope starting or kick starting while preventing the piston from being pushed back.

Figure 3:
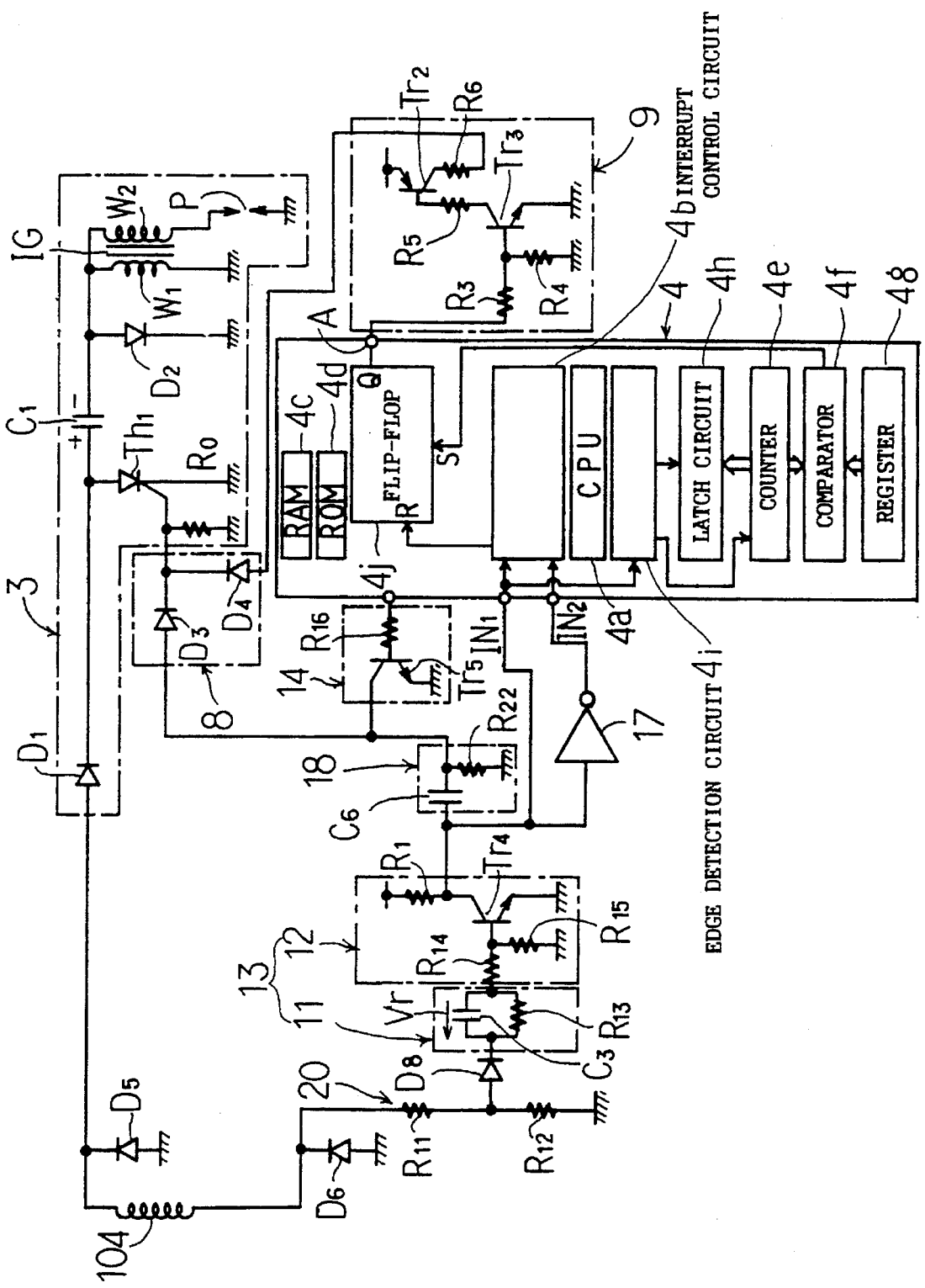

Embodiment of FIG. 3

FIG. 3 shows a further embodiment of the present invention, wherein a signal obtained at a collector of a transistor Tr4 of a reference signal output circuit 12 constructed in substantially the same manner as that in the embodiment of FIG. 1 is inverted by an inverter 17 and then fed in the form of an external interrupt signal IN2 to a control circuit 4b of a microcomputer 4. Also, a variation in potential at the collector of the transistor Tr4 is inputted to a level variation detection circuit 18 comprising a differentiation circuit constructed of a capacitor C6 and a resistor R22 and an output of the level variation detection circuit 18 is inputted in the form of a fixed ignition timing signal to an OR circuit 8. The remaining part of the illustrated embodiment may be constructed in substantially the same manner as the embodiment of FIG. 2.

In the embodiment of FIG. 3 thus constructed, a reference signal generating circuit 13, the inverter 17 and the level variation detection circuit 18 cooperate with each other to provide a reference signal/fixed ignition timing signal generating circuit which functions to generate a reference signal when a level of an output voltage Vb of a voltage detection circuit 20 coincides with a level of a reference voltage Vr in the course during which a level of an output voltage of a magneto during a non-charge period is increased toward a peak value and generate a fixed ignition timing signal when a level of an output voltage Vb of the voltage detection circuit coincides with a level of the reference voltage in the course during which a level of an output voltage of the magneto during the non-charge period is decreased past the peak.

In the embodiment of FIG. 3, when a level of an output voltage Vb of the voltage detection circuit 20 coincides with a level of a reference voltage Vr in the course during which an output voltage of a negative half cycle of the exciter coil 104 is increased toward a peak value, the transistor Tr4 is turned on, resulting in a potential at the collector thereof being reduced, so that the microcomputer 4 is fed with an external interrupt signal IN1.

Also, when a level of an output voltage Vb of the voltage detection circuit 20 coincides with a level of a reference voltage Vr in the course during which an output voltage of a negative half cycle of the exciter coil 104 is decreased past a peak value, to thereby render the transistor Tr4 turned off; a potential at the collector is varied from a low level to a high level, to thereby cause a level of an output voltage of the inverter 17 to be reduced from a state "1" to a state "0", resulting in the microcomputer 4 being fed with an interrupt signal IN2. Also, a variation of the level (a variation from a low level to a high level) when the transistor Tr4 is turned off is detected by the level variation detection circuit 18, so that the detection circuit 18 generates a pulse signal, which is then input in the form of a fixed ignition timing signal to the OR circuit 8.

Thus, in the embodiment of FIG. 3, a reference signal is generated when a level of an output voltage Vb of the voltage detection circuit 20 coincides with a level of the reference voltage Vr in the course during which an output voltage of a negative half cycle of the exciter coil is increased toward a peak value and a fixed ignition timing signal is generated when a level of an output voltage of the voltage detection circuit coincides with a level of the reference voltage in the course during which a level of an output voltage of a negative half cycle of the exciter coil is decreased past the peak. Also, at a fixed ignition timing signal generation position, the microcomputer is fed with an interrupt signal IN2, resulting in a flip-flop circuit 4j being reset.

The embodiment of FIG. 3 may be likewise constructed so that a position (a fixed ignition timing signal generation position) at which a level of an output voltage of a negative half cycle of the exciter coil coincides with a level of the reference voltage in the course during which it is decreased past the peak is set at a position which prevents a piston of the engine from being pushed back when ignition operation is carried out at the position at the time of starting of the engine. Such construction ensures smooth starting of the engine.

Figure 4:
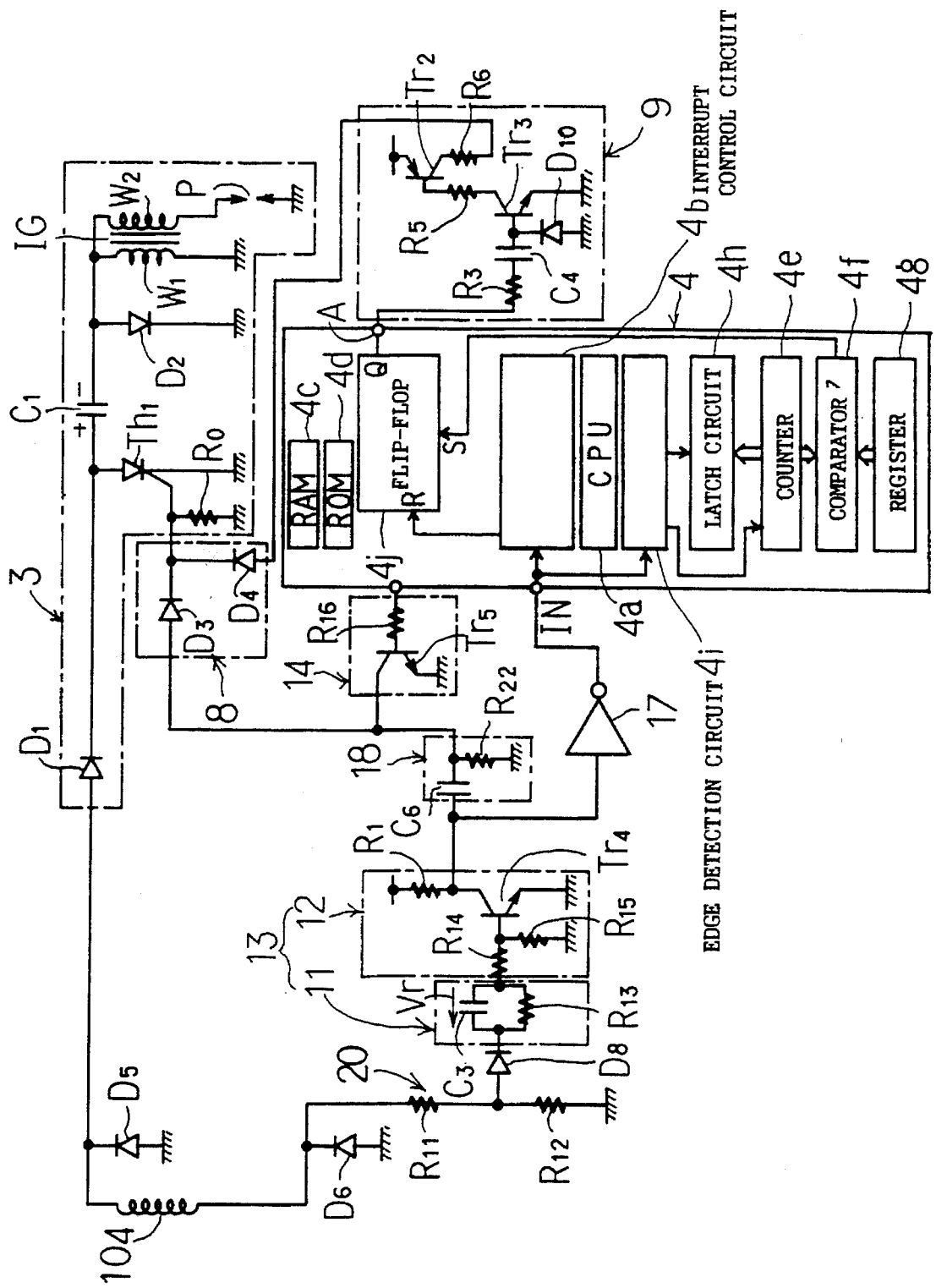

Embodiment of FIG. 4

FIG. 4 shows a modification of the embodiment of FIG. 3, wherein an ignition timing detection signal feed circuit 9 is constructed in substantially the same manner as in the embodiment of FIG. 1. In this instance, an ignition timing detection signal has a pulse waveform, so that resetting of a flip-flop circuit 4j may be delayed to a reference position at which a next interrupt signal IN is inputted thereto. Alternatively, the flip-flop circuit 4j may be reset when an interrupt signal IN is provided or reset by means of a software before the interrupt signal IN is provided.

In each of the embodiments described above, the reference voltage generating circuit 11 is connected in series to the drive signal input terminal of the reference signal output switch (which is the transistor Tr4 in each of the embodiments), to thereby cause a reference signal to be generated when an output voltage of a negative half cycle of the exciter coil coincides with a predetermined reference level (or an output voltage of the voltage detection circuit coincides with a reference voltage). However, the reference signal generating circuit incorporated in the present invention is merely required to compare a detected value of an output voltage of the magneto during the non-charge with the reference voltage, to thereby generate a signal when the detected value of the output voltage coincides with the reference voltage. Thus, it will be noted that the reference signal generating circuit is not limited to the above-described construction.

Figure 5:
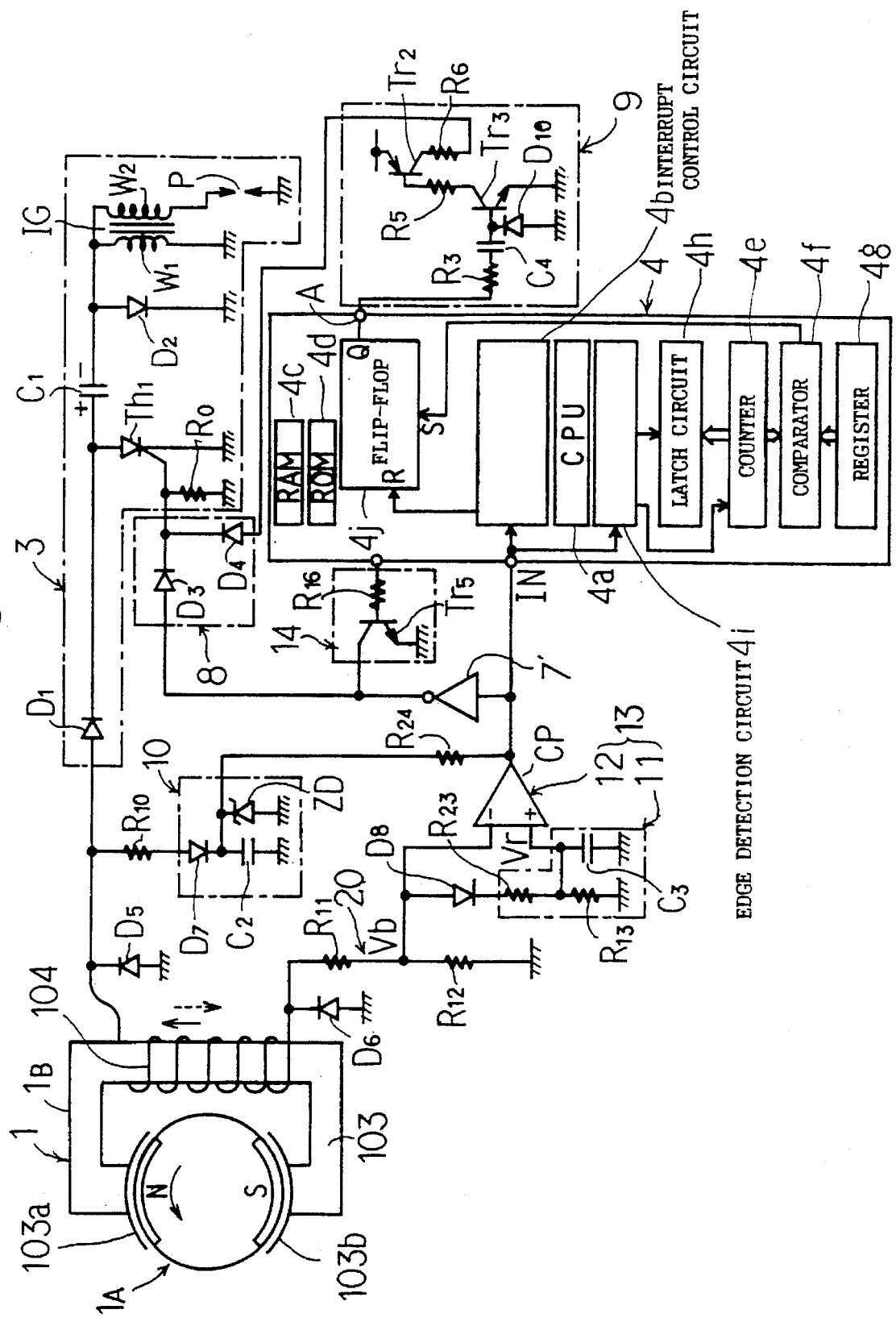

Embodiment of FIG. 5

FIG. 5 shows still another embodiment of a present invention, wherein a reference signal generating circuit is constructed in a manner different from that in each of the above-described embodiments. In the illustrated embodiment, a reference voltage generating capacitor C3 charged through a diode D8 and a resistor R23 by means of a voltage Vb (an output voltage of a voltage detection circuit 20) obtained by subjecting an output voltage of a negative half cycle of an exciter coil to voltage dividing through a voltage dividing circuit constructed of resistors R11 and R12 and a resistor R13 connected across the capacitor C3 cooperate with each other to provide a reference voltage generating circuit 11; wherein a reference voltage Vr induced across the capacitor C3 is inputted to a non-inversion input terminal of a comparator CP. The comparator CP has an inversion input terminal to which an output voltage Vb of the voltage detection circuit 20 is inputted, as well as an output terminal connected through a resistor R24 to an output terminal of a power circuit 10. In the illustrated embodiment, the comparator CP provides a reference signal output circuit 12, which cooperates with the reference voltage generating circuit 11 to provide a reference signal generating circuit 13.

A signal provided at the output terminal of the comparator CP is inputted in the form of an external interrupt signal IN to an interrupt signal input port of a microcomputer 4 as well as in the form of a fixed ignition timing signal to an OR circuit 8 through an inverter 7'. The remaining part of the illustrated embodiment may be constructed in substantially the same manner as the embodiment of FIG. 1.

In the embodiment shown in FIG. 5, a level of a reference voltage Vr induced across the capacitor C3 is varied with a variation in peak value of an output voltage of a negative half cycle of the exciter coil and a variation in frequency thereof. When a level of an output voltage Vb of the voltage detection circuit 20 coincides with a level of the reference voltage Vr in the course during which an output voltage of a negative half cycle of the exciter coil is increased toward a peak value, a potential at the output terminal of the comparator CP falls to a low level. Such a decrease in potential is fed in the form of an interrupt signal IN (a reference signal) to a microcomputer. Also, the decrease in potential at the output terminal of the comparator CP is inverted by the inverter 7' and then fed in the form of a fixed ignition timing signal to the OR circuit 8. The remaining part of operation of the illustrated embodiment may be carried out in substantially the same manner as the embodiment of FIG. 1.

In each of the embodiments described above, the reference position is detected utilizing or by means of a waveform of an output voltage of a negative half cycle of the exciter coil. However, in the present invention, it is merely required that the reference position at which measuring of the ignition timing is started is detected by means of a waveform of an output voltage of a half cycle of the magneto during the non-charge period (a rotation angle period during which the ignition energy accumulating capacitor is kept from being charged). Thus, when a generating coil is arranged in addition to the exciter coil in the magneto, a reference signal may be provided by means of a waveform of an output voltage of a half cycle of the generating coil during a non-charge period thereof.

Figure 6:
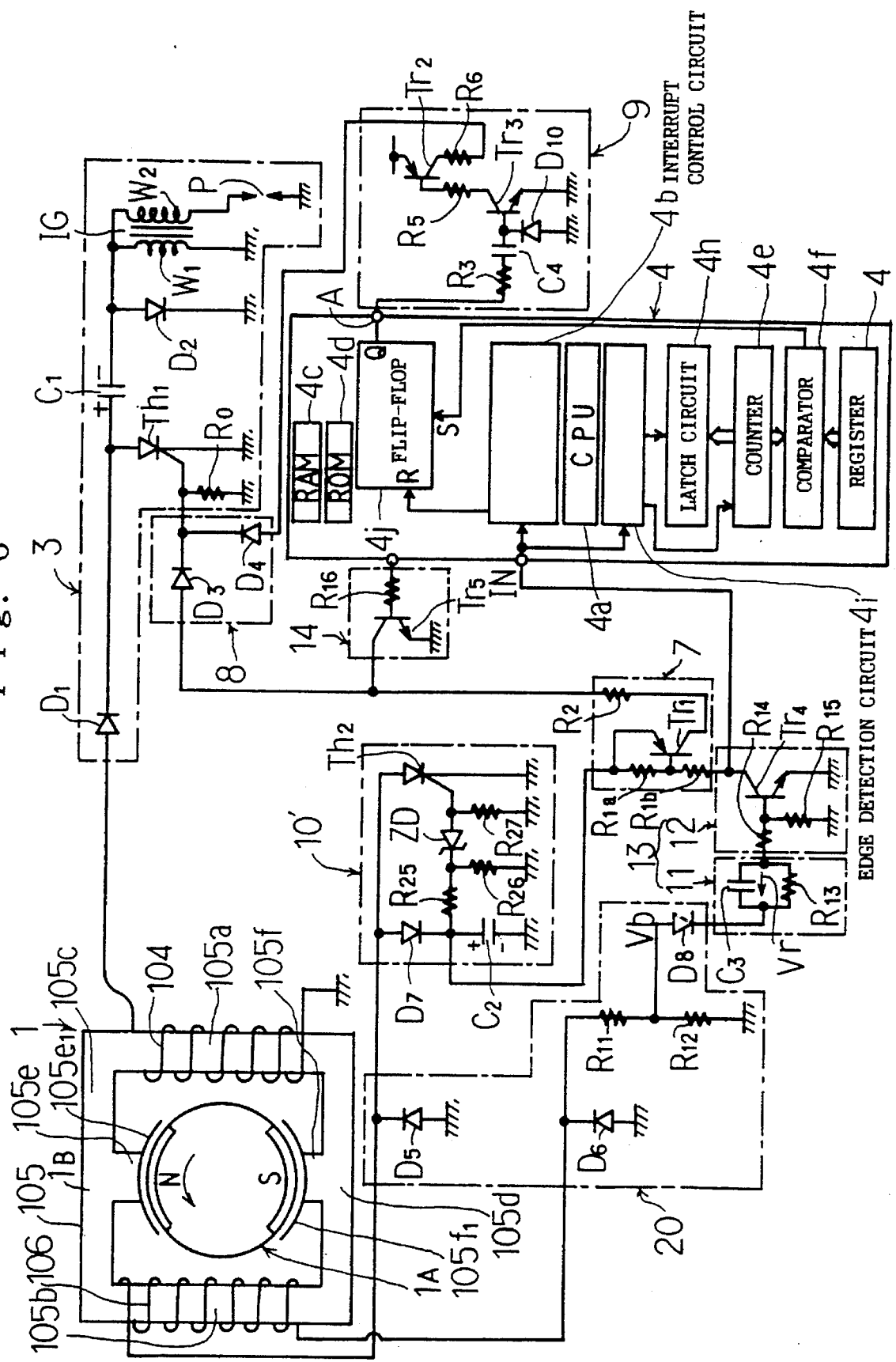

Embodiment of FIG. 6

FIG. 6 shows an embodiment of the present invention which is constructed so as to generate a reference signal by means of an output of a generating coil arranged in addition to an exciter coil. In the illustrated embodiment, a magneto 1 includes a stator 1B constructed of a core 105, which includes a pair of side leg sections 105a and 105b, a pair of yoke sections 105c and 105d for connecting both side leg sections together and a pair of salient pole sections 105e and 105f provided at a central portion of the yoke sections 105c and 105d, an exciter coil 104 wound on the side leg section 105a of the core 105, and a generating coil 106 wound on the side leg 105b of the core 105. The salient pole sections 105e and 105f are formed at a distal end thereof with pole elements 105e1 and 105f1, respectively, which are arranged so as to be opposite to a two-pole magnet rotor 1A.

In the magneto 1 thus constructed, the exciter coil 104 and generating coil 106 each generate an AC voltage of an identical phase of one cycle at every one rotation of the engine.

In the embodiment of FIG. 6, the generating coil 106 has diodes D5 and D6 respectively connected between one end thereof and the ground and the other end thereof and the ground. Also, the illustrated embodiment includes a power circuit 10' connected between the one end of the generating coil 106 and the ground and constructed in a manner unlike that in the embodiment of FIG. 1. The power circuit 10' includes a series circuit of a diode D7 connected between the one end of the generating circuit 106 and the ground and a power capacitor C2, a thyristor Th2 connected between the one end of the generating coil 106 and the ground so that a cathode thereof faces the ground, a series circuit of resistors R25 and R26 connected across the capacitor C2, a Zener diode ZD connected between a gate of the thyristor Th2 and a connection between the resistors R25 and R26 so that an anode thereof faces the gate of the thyristor Th2, and a resistor R27 connected to a gate-cathode circuit of the thyristor Th2.

In the power circuit 10' thus constructed, an output voltage of a positive half cycle of the generating coil 106 causes the capacitor C2 to be charged through the diode D7. When a voltage across the capacitor C2 exceeds a set level, the Zener diode ZD is turned on to trigger the thyristor Th2, so that the thyristor is turned on to cause a charging current for the capacitor C2 to be bypassed from the capacitor C2. Such operation permits a voltage across the capacitor C2 to be kept constant.

Between the other end of the generating coil 106 and the ground is connected a voltage dividing circuit comprising a series circuit of resistors R11 and R12, which cooperates with a diode D8 and the diode D5 to provide a voltage detection circuit 20. The voltage detection circuit 20 generates an output voltage Vb, which is inputted to a reference signal generating circuit 13. The reference signal generating circuit 13 may be constructed in substantially the same manner as in the embodiment of FIG. 1, wherein a transistor Tr4 has a collector constituting a reference signal generating switch and connected to an output terminal of the power circuit 10' through resistors R1a and R1b.

The exciter coil 104 is connected at one end thereof through a diode D1 to one end of an ignition energy accumulating capacitor C1 and grounded at the other end. The remaining part of the illustrated embodiment may be constructed in substantially the same manner as the embodiment of FIG. 1. Operation of the illustrated embodiment is carried out in substantially the same manner as the embodiment of FIG. 1, except that a reference signal is generated by means of a waveform of an output voltage of a negative half cycle generated by a generating coil 106 while the exciter coil generates an output voltage of a negative half cycle (or an output voltage of a half cycle of the magneto 1 during a non-charge period).

In each of the embodiments shown in FIGS. 1, 4, 5 and 6, the fixed ignition timing signal provided when the microcomputer fails to operate is generated by means of the reference signal, therefore, it is required to set the reference signal generation position at a position which permits the ignition operation to be carried out and permits a basis for measuring of the ignition timing to be established. For this purpose, in each of the embodiments of FIGS. 1, 4, 5 and 6, it is required to render the reference position equal to a maximum advanced position.

On the contrary, in each of the embodiments of FIGS. 2 and 3, the fixed ignition timing signal provided when the microcomputer fails to operate is generated at a position delayed from the reference signal, therefore, the reference signal generation position may be set at any position so long as it is suitable for a basis for measuring of the ignition timing, resulting in being not necessarily a maximum advanced position. Thus, the reference signal generation position may be set at a position advanced from a maximum advanced position as well.

In each of the embodiments described above, a voltage induced across the transistor Tr4 (the reference signal generating switch) of the reference signal generating circuit when a detected value of an output voltage of the magneto during the non-charge period coincides with the reference voltage in the course during which the output voltage is increased toward a peak is used as the reference signal. Alternatively, a variation in voltage across the transistor Tr4 occurring when a detected value of an output voltage of the magneto during the non-charge period coincides with the reference voltage in the course during which the output voltage is decreased past peak may be used as the reference signal. In this instance, a signal provided by inverting an output signal of the inverter 17 in the embodiment of FIG. 3 or an output pulse of the level detection circuit 18 may be used as the reference signal (the external interrupt signal IN1).

The peak detection circuit incorporated in the embodiment of FIG. 2 may be generally constructed of a peak detection capacitor, a first peak detection transistor fed with a base current through the peak detection capacitor by means of an output of a negative half cycle of the exciter coil, resulting in being turned on, and a second peak detection transistor kept turned off when the first peak detection transistor is kept on and rendered turned on when the first peak detection transistor is turned off. Thus, the peak detection circuit is not limited to such construction as described above.

Figure 12:
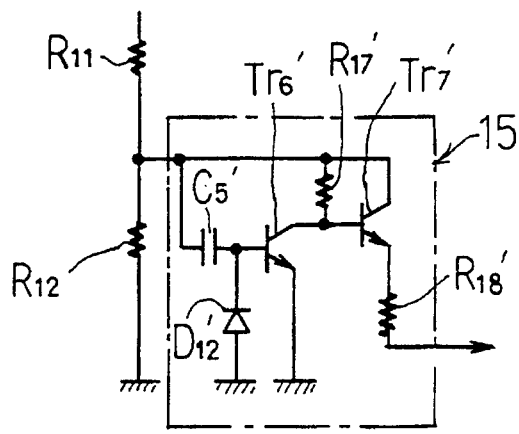
FIG. 12 is a circuit diagram showing an example of a peak detection circuit incorporated in an embodiment of the present invention.

For example, the peak detection circuit, as shown in FIG. 12, may be constructed of first and second peak detection transistors Tr6' and Tr7', resistors R17' and R18', a peak detection capacitor C5', and a diode D12'.

In the peak detection circuit of FIG. 12, when the magneto generates an output voltage of a half cycle in the non-charge period, the transistor Tr6' is fed with a base current through the capacitor C5', resulting in being turned on. While the transistor Tr6' is kept turned on, the transistor Tr7' is kept turned off. When an output voltage of a negative half cycle of the exciter coil reaches a peak, charging of the capacitor C5' is interrupted, to thereby cause the transistor Tr6' to be turned off and the transistor Tr7' to be turned on. Thus, a peak detection signal is outputted through a collector-emitter circuit of the transistor Tr7' and the resistor R18' at a peak position of an output of a negative half cycle of the exciter coil.

Figure 13:
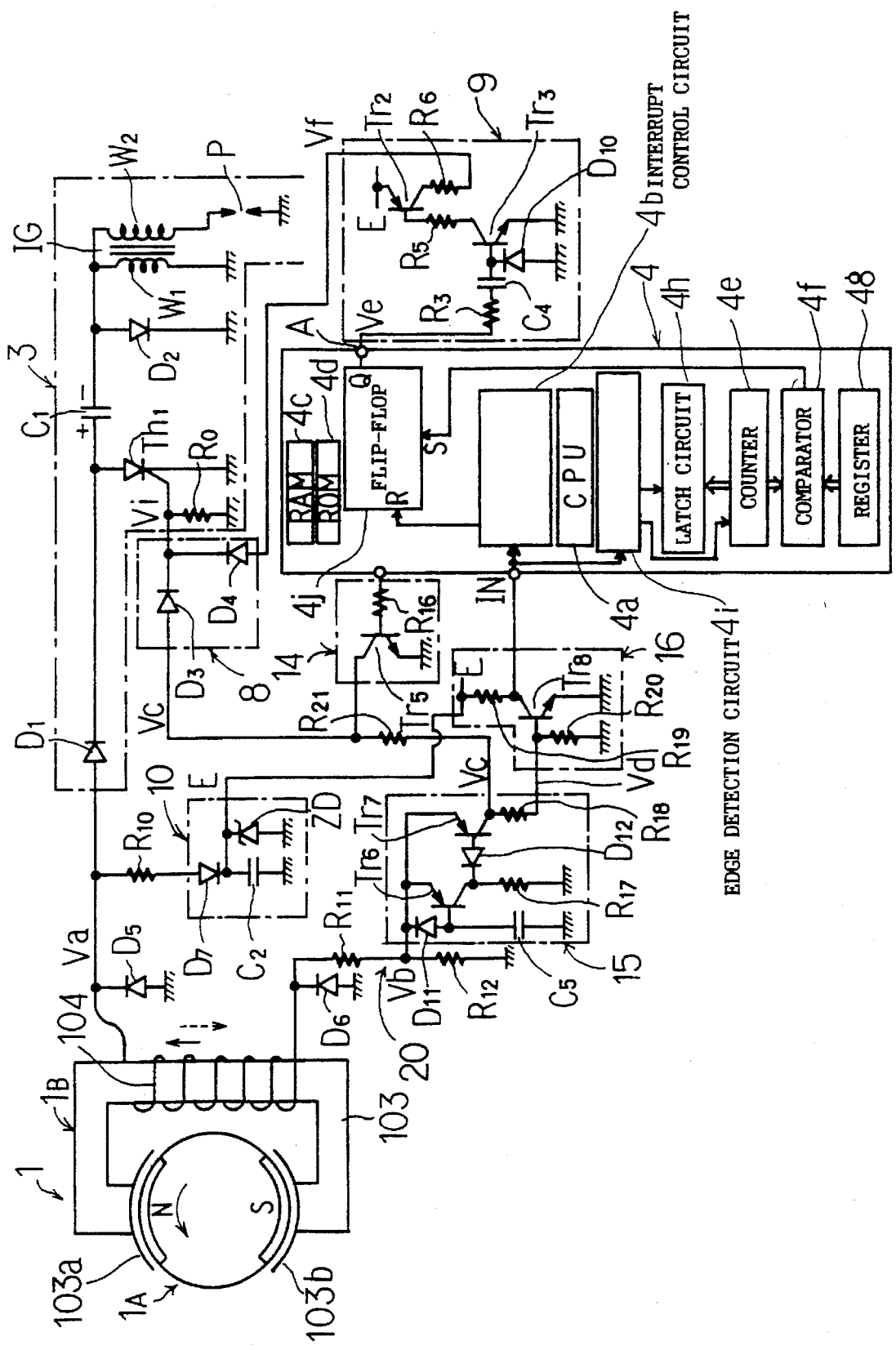
FIGS. 13 and 14 each are a circuit diagram showing a further embodiment of the present invention.

Embodiment of FIG. 13

In each of the embodiments described above, a position at which an output voltage of the magneto during the non-charge period coincides with a predetermined reference level is defined to be the reference position. Alternatively, a peak position of an output voltage of the magneto during the non-charge period may be defined to be the reference position.

FIG. 13 shows an embodiment of the present invention wherein a peak position of an output voltage of a magneto is defined to be a reference position. In the illustrated embodiment, a voltage Vb induced across a resistor R12 of a voltage detection circuit 20 is inputted to a peak detection circuit 15 which is constructed in substantially the same manner as in the embodiment shown in FIG. 2. The voltage detection circuit 20 and peak detection circuit 15 cooperate with each other to provide a reference signal generating circuit, so that when an output voltage of an exciter coil 104 in a non-charge period reaches a peak, a transistor Tr7 of the peak detection circuit 15 is turned on, resulting in a reference signal Vd being outputted through the transistor Tr7 thus turned on. The reference signal is then inputted to an interrupt signal output circuit 16 which is constructed in substantially the same manner as in the embodiment of FIG. 2, so that an output of the interrupt signal output circuit is inputted in the form of an external interrupt signal IN to an interrupt control circuit 4b of a microcomputer 4 and an edge detection circuit 4i thereof. Also, the transistor Tr7 of the peak detection circuit 15 is connected at a collector thereof through a resistor R21 and a diode D3 of an OR circuit 8 to a gate of a discharge thyristor Th1, so that when the transistor Tr7 is turned on to cause a reference signal to be generated, a fixed ignition timing signal Vc is fed through the resistor R21 and OR circuit 8 to an ignition circuit 3. The reference voltage generating circuit 11 and reference signal output circuit 12 incorporated in the embodiment of FIG. 2 are omitted from the illustrated embodiment. Also, the illustrated embodiment includes an ignition timing detection signal feed circuit 9 including a resistor R3 and arranged between an output port A of the microcomputer 4 and the OR circuit 8 and a capacitor C4 inserted between the resistor R3 and a base of the transistor Tr3, as well as a diode D10 connected between the base of the transistor Tr3 and the ground so that an anode thereof faces the ground, resulting in an ignition timing detection signal fed to the ignition circuit 3 having a pulse-like waveform. The remaining part of the illustrated embodiment may be constructed in substantially the same manner as the embodiment of FIG. 2. Thus, the reference voltage generating circuit 11 and reference signal output circuit 12 used in the embodiment of FIG. 2 are omitted from the embodiment of FIG. 13; wherein an output of the peak detection circuit 15 is used as the reference signal, so that when the reference signal is generated, an external interrupt signal IN is fed through the interrupt signal output circuit 16 to the microcomputer 4.

The transistors Tr6 and Tr7 which are incorporated in the illustrated embodiment are constructed so as to exhibit sensitivity of a high level in order to ensure that the peak detection circuit 15 can be operated by means of a voltage substantially lower than a voltage required for driving the microcomputer 4.

Figure 15:
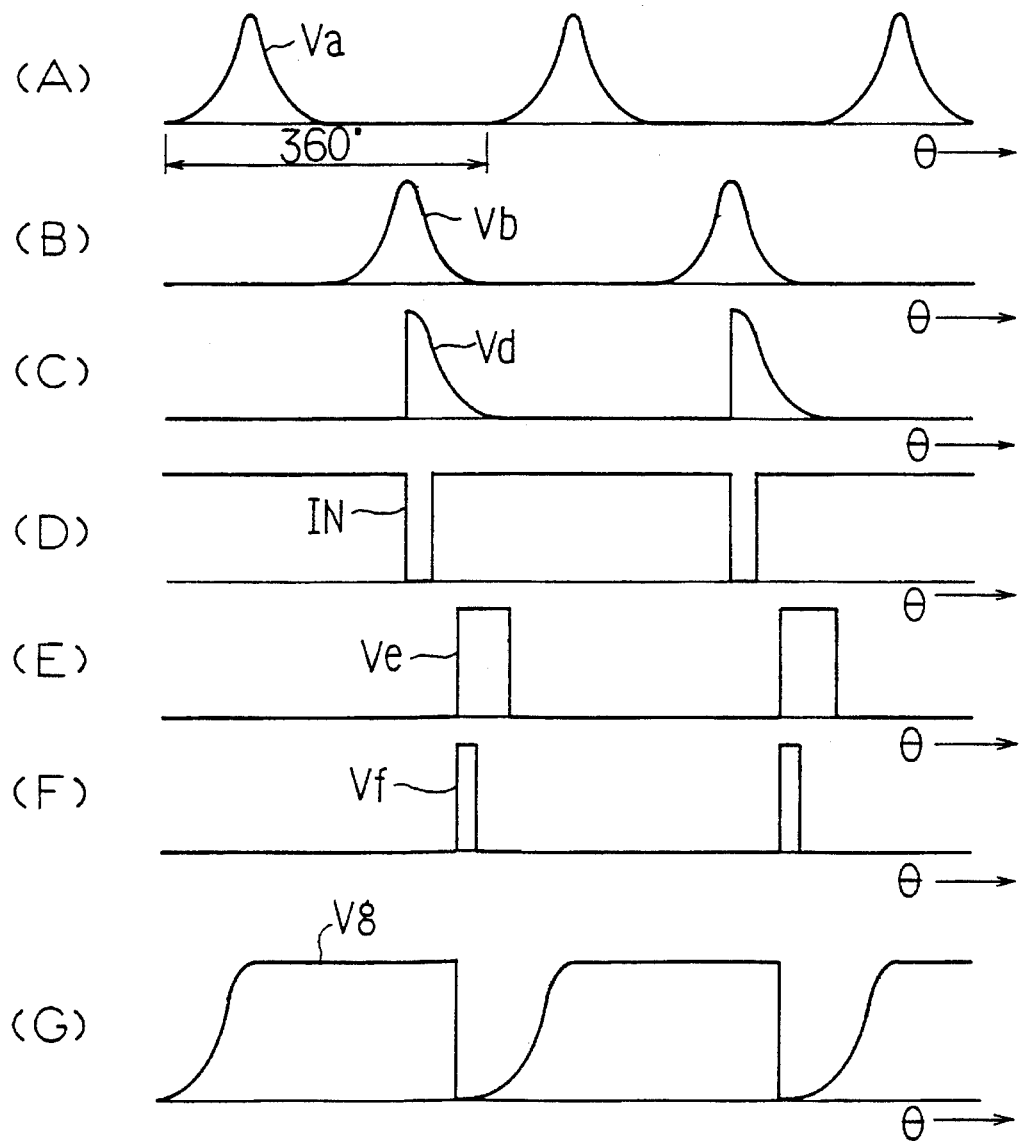
FIG. 15 is a waveform chart showing a signal waveform at each of sections in the embodiment shown in FIG. 13.

Relationship of a non-load waveform of a voltage Va between an anode of a diode D1 and the ground to a rotation angle Θ of the engine which is obtained in the embodiment of FIG. 13 is as shown in (A) of FIG. 15 and a waveform of a voltage Vg across an ignition energy accumulating capacitor C1 is as shown in (G) of FIG. 15.

When the discharge thyristor TH1 is fed with an ignition signal Vi after charging of the capacitor C1, the thyristor Th1 is turned on to cause charges in the capacitor C1 to be discharged to a primary winding of an ignition coil IG, resulting in ignition operation being carried out.

When the exciter coil 104 generates an output voltage of a negative half cycle (an output voltage during the non-charge period), such a voltage Vb as shown in (B) of FIG. 15 appears at a voltage dividing point of a voltage dividing circuit comprising resistors R11 and R12, to thereby cause a current to flow through an emitter of a first peak detection transistor Tr6, a base thereof and a peak detection capacitor C5. The transistor Tr6 is kept turned on while the current flows and the transistor Tr7 is kept turned off while the transistor Tr6 is turned on. When an output voltage of a negative half cycle of the exciter coil 104 reaches a peak, charging of a capacitor C3 is completed to keep the transistor Tr6 from being fed with a base current, so that the transistor Tr4 is turned off and the transistor Tr7 is turned on. This causes a reference signal (a peak detection signal) Vd to be outputted from the exciter coil 104 through the transistor Tr7, so that the reference signal causes a transistor Tr8 to be fed with a base current. The reference signal Vd (a voltage across a collector of the second peak detection transistor Tr7) has such a waveform as shown in (C) of FIG. 15.

Generation of the reference voltage Vd causes a base current to be fed through a resistor R18 to the transistor Tr8, leading to turning-on of the transistor Tr8, so that a potential at a collector thereof falls to a zero level. A waveform of the potential at the collector of the transistor Tr8 is as shown in (D) of FIG. 15 and such falling of the potential is fed in the form of an external interrupt signal IN to the interrupt control circuit 4b and edge detection circuit 4i of the microcomputer. Operation of the illustrated embodiment after the microcomputer is fed with the interrupt signal IN is carried out in substantially the same manner as in the embodiment of FIG. 1. (E) of FIG. 15 shows an example of a waveform of an ignition timing detection signal Ve provided at the output port A of the microcomputer 4 and (F) of FIG. 15 shows a waveform of an ignition timing detection signal Vf which an ignition timing detection signal feed circuit 9 outputs when an ignition timing operated is detected to cause the signal Ve to be varied from a low level to a high level.

During a period for which an output of a power circuit 10 is not established during low speed operation of the engine, the microcomputer fails to operate. Under such conditions, an ignition signal Vi is fed through the resistor R21 and the diode D3 of the OR circuit 8 to the discharge thyristor Th1 when the peak detection circuit 15 generates a reference signal Vd. Thus, during low speed operation of the engine, ignition operation takes place at a peak position of an output voltage of a negative half cycle of the exciter coil.

A peak position of an output voltage of a negative half cycle of the exciter coil 104 is rendered substantially constant; therefore, when a peak position of an output voltage of a negative half cycle of the exciter coil 104 is defined to be the reference position as described above, the reference position is rendered substantially constant irrespective of a rotational speed N of the engine.

Figure 14:
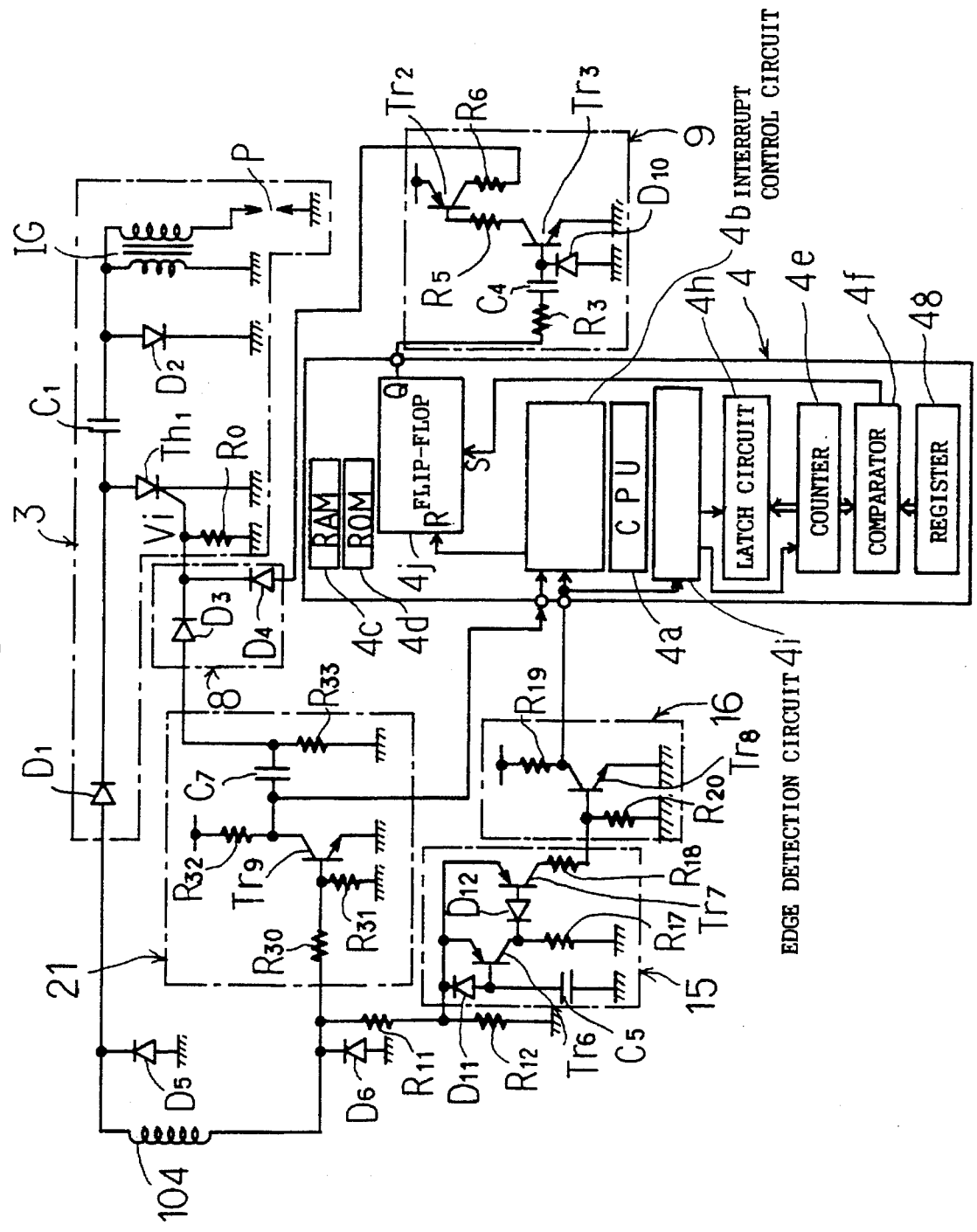

Embodiment of FIG. 14

In the embodiment of FIG. 13, the reference signal is normally generated at a maximum advanced position; therefore, when an ignition signal for low speed operation of the engine is to be provided by means of the reference signal, there is a disadvantageous phenomenon that a piston is pushed back depending on an internal combustion engine when it is started by rope starting or kick starting. FIG. 14 shows an embodiment of the present invention which is adapted to solve such a problem, wherein a fixed ignition timing signal generating circuit 21 constructed of a transistor Tr9, resistors R30 to R33 and a capacitor C7 is provided for this purpose. Also, the reference signal mask circuit 14 incorporated in the embodiment of FIG. 13 is omitted from the illustrated embodiment. The remaining part of the illustrated embodiment may be constructed in substantially the same manner as the embodiment of FIG. 13. A power circuit 10 for feeding a microcomputer 4, an interrupt signal output circuit 16 and an ignition timing detection signal feed circuit 9 with a DC power supply voltage is not shown in FIG. 14 for the sake of brevity.

In the embodiment of FIG. 14, when an exciter coil 104 generates an output voltage of a negative half cycle during a non-charge period, the transistor Tr9 is fed with a base current through the resistor R30, resulting in being turned on. During a period for which the exciter coil 104 generates an output voltage of a negative half cycle, the transistor Tr9 is kept turned on, so that the capacitor C7 is kept from being charged. When a period of a negative half cycle of the exciter coil 104 terminates, the transistor Tr9 is rendered turned off, resulting in the capacitor C7 being charged by a power circuit (not shown) through the resistor R32, so that a pulse-like fixed ignition timing signal is generated through the capacitor C7. The fixed ignition timing signal is then fed through a diode D3 of an OR circuit 8 to a discharge thyristor Th1.

Such construction of the illustrated embodiment ensures smooth starting of an internal combustion engine by rope starting or kick starting while preventing a piston of the engine from being pushed back, when a position at which a negative half cycle of the exciter coil 104 terminates (or a fixed ignition timing signal generation position) is set at a position delayed so as to be suitable for an ignition timing for starting of the engine. The fixed ignition timing signal generation position may be normally set at a minimum advanced position. Alternatively, it may be set at a position some what advanced from the minimum advanced position (a position delayed from a maximum advanced position).

In the illustrated embodiment, the transistor Tr9 functions as a fixed ignition timing detection transistor which is turned on by an output voltage of a negative half cycle of the exciter coil acting as a trigger signal and kept turned during a period for which the negative half cycle output voltage is generated, and the capacitor C7 and resistor R33 cooperate with each other to provide a differentiation circuit for differentiating a voltage across a collector-emitter circuit of the fixed ignition timing detection transistor Tr9.

The fixed ignition timing signal generating circuit 21 is merely required to principally include a waveform shaping circuit for shaping an output of a negative half of the exciter coil into a rectangular-waveform signal and a differentiation circuit for detecting falling of the rectangular-waveform signal generated by the waveform shaping circuit to generate a pulse-like signal in the form of a fixed ignition timing signal. In the embodiment of FIG. 14, the fixed ignition timing detection transistor Tr9 and resistors R30 to R32 cooperated with each other to provide the waveform shaping circuit.

In the embodiment of FIG. 13 described above, the reference signal is used as an ignition signal for starting of the engine, so that it is required to set the reference signal generation position at a position which permits the ignition operation to be carried out and permits a basis for measuring of ignition timing to be established. For this purpose, in the embodiment of FIG. 13, the reference position (a peak position of an output voltage of a negative half cycle of the exciter coil 104) is rendered equal to a maximum advanced position.

On the contrary, in the embodiment of FIG. 14, an ignition signal for starting of the engine is generated separately from the reference signal, so that the reference signal generation position is merely required to be suitable for a basis for measuring of the ignition timing and is not necessarily required to be a maximum advanced position. Thus, in the embodiment of FIG. 14, it may be set at a position further advanced from a maximum advanced position.

Figure 16:
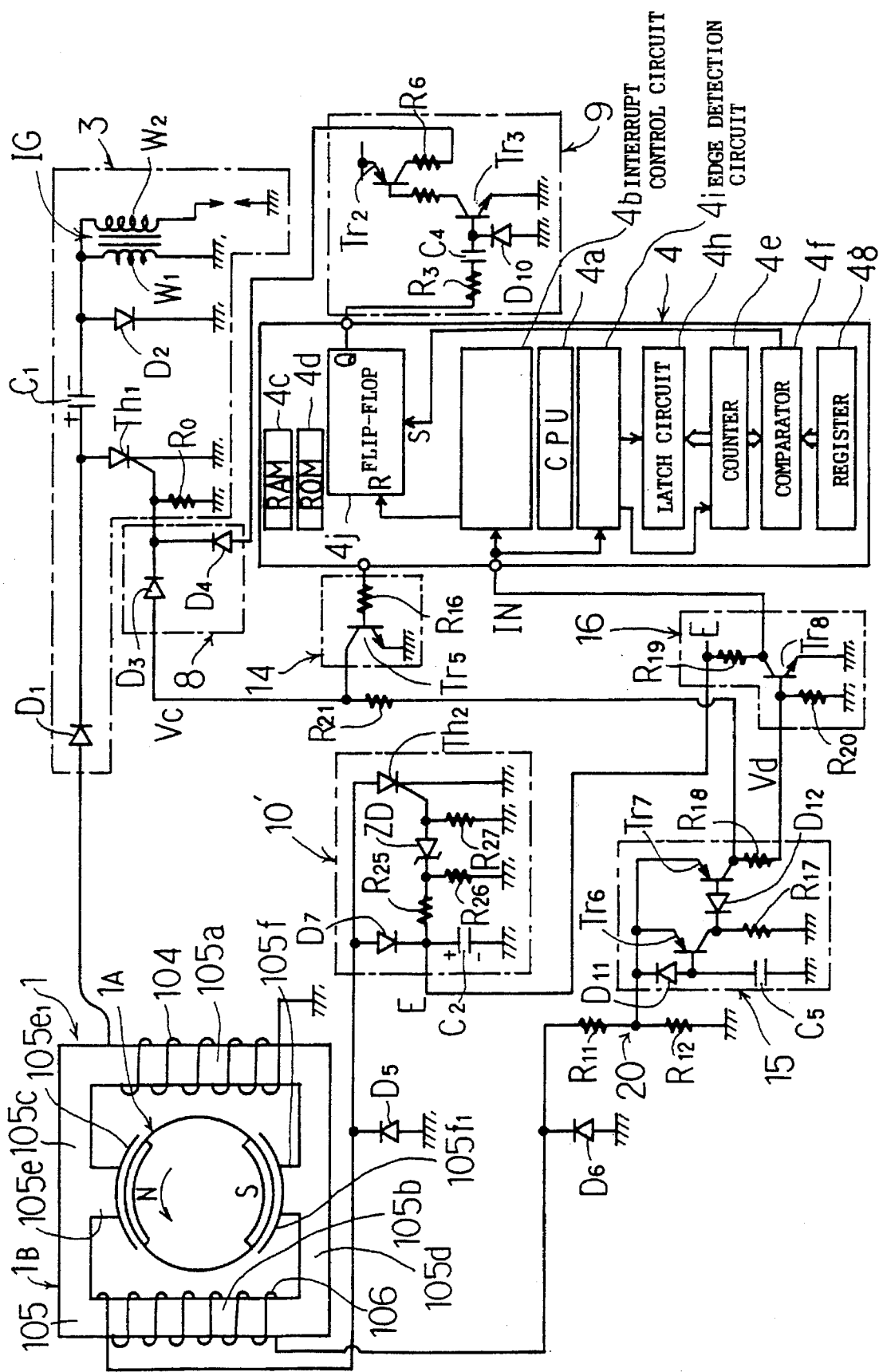
FIGS. 16 to 21 each are a circuit diagram showing still another embodiment of the present invention.

Embodiment of FIG. 16

In each of the embodiments shown in FIGS. 13 and 14, a peak position of a negative half cycle of the exciter coil is detected to generate the reference position. Alternatively, when the magneto is provided therein with a generating coil in addition to the exciter coil, it is possible to generate the reference signal by detecting a peak position of an output voltage of the generating coil during a non-charge period of the generating coil (a period of a half cycle during which the exciter coil does not carry out charging of the ignition energy accumulating capacitor).

FIG. 16 shows an embodiment of the present invention which is constructed so as to detect a peak position of an output voltage of a generating coil arranged separate from an exciter coil during a non-charge period of the generating coil, to thereby generate a reference signal. The embodiment includes a magneto 1 constructed in substantially the same manner as in the embodiment of FIG. 6, wherein diodes D5 and D6 are respectively connected between one end of a generating coil 106 of the magneto and the ground and between the other end thereof and the ground, and a power circuit 10' constructed in substantially the same manner as in the embodiment of FIG. 6 is connected between the one end of the generating coil 106 and the ground.

Between the other end of the generating coil 106 and the ground is connected a voltage detection circuit 20 comprising a series circuit of resistors R11 and R12 and a peak detection circuit 15 is connected to an output side of the detection circuit. The peak detection circuit may be constructed in substantially the same manner as that incorporated in the embodiment of each of FIGS. 13 and 14 and a reference signal generated from the peak detection circuit is fed in the form of an interrupt signal IN to a microcomputer 4 through an interrupt output circuit 16 constructed in substantially the same manner as in FIG. 13. An exciter coil 104 is connected at one end thereof through a diode D1 to one end of an ignition energy accumulating capacitor C1 and grounded at the other end thereof. The remaining part of the illustrated embodiment may be constructed in substantially the same manner as the embodiment of FIG. 13.

Operation of the embodiment of FIG. 16 is carried out in substantially the same manner as the embodiment of FIG. 13, except that the reference signal is generated by means of an waveform of an output voltage of a negative half cycle of the generating coil 106 during a period for which the exciter coil generates an output voltage of a negative half cycle (an output voltage of a half cycle of the magneto 1 during the non-charge period).

The embodiment of FIG. 16 is so constructed that the generating coil 106 generates an output voltage of a phase identical with that of the exciter coil 104. Alternatively, the magneto may be constructed in such a manner that the generating coil 106 generates an output voltage of a phase opposite to that of the exciter coil 104, to thereby cause a peak of an output voltage of a positive half cycle generated by the generating coil 106 during the non-charge period to be detected, resulting in the reference signal being generated.

When the generating coil 106 is arranged in addition to the exciter coil, the embodiment may be constructed so as to detect a peak of an output voltage of the generating coil 106 during the non-charge period to generate the reference signal, resulting in a position at which a period of a negative half cycle (the non-charge period) of the exciter coil terminates being detected to generate the fixed ignition timing signal. Alternatively, the reference signal may be generated by detecting a peak of an output of a negative half cycle of the exciter coil, so that a position at which a period of a half cycle of the generating coil during the non-charge period terminates is detected to generate the fixed ignition timing signal.

Figure 17:
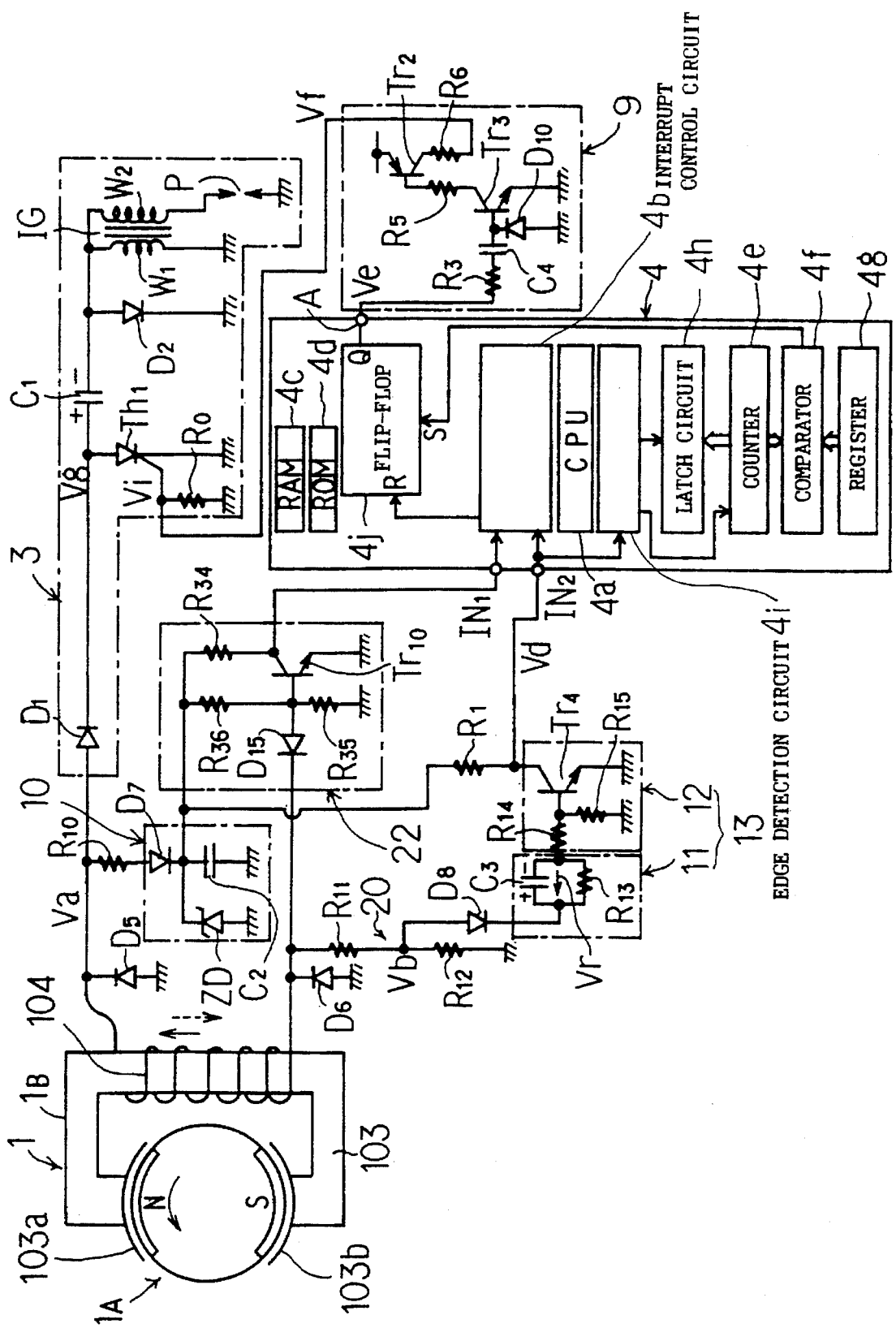

Embodiment of FIG. 17

The present invention may be constructed in such a manner that a period of time extending from time at which an output of the magneto is transferred from the charge period to the non-charge period to time at which the reference signal is generated is detected and then multiplied by a constant $\alpha$ of 1 or less, resulting in a counted value for measuring of the ignition timing during each of starting operation and low speed operation of the engine being operated to count the counted value, leading to measuring of the ignition timing during each of the starting operation and low speed operation.

FIG. 17 shows an embodiment of the present invention which is constructed so as to obtain an ignition timing of an internal combustion engine during each of starting operation and low speed operation thereof by operation. The illustrated embodiment includes a reference signal generating circuit 13 constituted by a reference voltage generating circuit 11 constructed in substantially the same manner as in the embodiment of FIG. 1 and a reference signal output circuit 12. The reference signal output circuit 12 includes a transistor Tr4 which is connected at a collector thereof through a resistor R1 to an output terminal of a power circuit 10. The reference signal generating circuit 13 generates a reference signal Vd, which is fed in the form of an external interrupt signal IN2 to a microcomputer 4.

The illustrated embodiment is provided with a boundary detection circuit 22 for detecting a boundary between a charge period and a non-charge period to generate a boundary detection signal when transition from the charge period to the non-charge period is carried out. The boundary detection circuit 22 may be constructed of a transistor switch circuit which is turned off when an output voltage of a magneto during the charge period is generated and turned on when it generates an output voltage during the non-charge period.

The boundary detection circuit 22 shown in FIG. 17 is constituted by an NPN transistor Tr10, resistors R34 to R36, and a diode D15. More specifically, the transistor Tr10 is grounded at an emitter thereof and connected at a collector thereof through the resistor R34 to an output terminal of a DC power circuit 10. The transistor Tr10 is connected at a base thereof through the resistors R35 and R36 to a ground terminal and the output terminal of the DC power circuit, respectively, as well as through the diode D15 to a connection between an exciter coil 104 and a diode D6 while keeping an anode of the diode D15 facing the base of the transistor Tr10. When the exciter coil 104 generates an output voltage of a positive half cycle, a whole current fed from the DC power circuit 10 through the resistor R36 flows through the diode 15 toward the exciter coil 104, so that the transistor Tr10 is kept from being fed with a base current, to thereby be turned off. When the exciter coil 104 generates an output voltage of a negative half cycle, the transistor Tr10 is fed with a base current, to thereby be turned on. This permits a collector-emitter circuit of the transistor Tr10 to be provided with a boundary detection signal having a waveform falling from a high level to a low level at a position of transition from the charge period to the non-charge period. The boundary detection signal is then fed in the form of an interrupt signal IN1 to an interrupt control circuit 4b of the microcomputer 4.

Also, in the illustrated embodiment, an ignition timing detection signal feed circuit 9 generates an ignition timing detection signal Vf, which is inputted in the form of an ignition signal Vi to a gate of a discharge thyristor Th1. The OR circuit 8 incorporated in the embodiment of FIG. 1 is omitted from the illustrated embodiment. The remaining part of the illustrated embodiment may be constructed in substantially the same manner as the embodiment of FIG. 1.

A waveform of a voltage Va between an anode of a diode D1 and the ground during no-load, a waveform of an output voltage Vb of a voltage detection circuit 20, a waveform of a fixed ignition timing signal Vc, a waveform of a reference voltage Vd, a waveform of a signal Ve provided at an output port A of the microcomputer 4, a waveform of an ignition timing detection signal Vf and a waveform of a voltage Vg across an ignition energy accumulating capacitor C1 in the embodiment of FIG. 17 are substantially identical with those in the embodiment of FIG. 1 shown in (A) to (G) of FIG. 9, respectively.

When the interrupt control circuit 4b is fed with an interrupt signal IN2, an edge detection circuit 4i detects falling thereof to operate a latch circuit 4h. The latch circuit 4h latches a value counted by a counter 4e when the interrupt signal IN2 is generated. The interrupt control circuit 4b causes the latch circuit 4h to latch the counted value of the counter 4e and clears the counter 4e. The counter 4e is cleared immediately after the counted value of the counter is latched, so that the counted value latched corresponds to a period of time required for one revolution of an internal combustion engine. The counted value per se or an engine speed operated on the basis of the counted value is used as data for indicating a rotational speed Ne of the engine.

The microcomputer includes a ROM 4d having a predetermined program and a map used to operate an ignition timing stored therein. The program permits a main routine shown in FIG. 10 and an interrupt routine shown in FIGS. 22 and 23 to be carried out.

In the main routine shown in FIG. 10, a process of firstly subjecting each of sections to initialization when a power supply is established and operating an ignition timing $\Theta$ig at each rotational speed Ne in the form of a counted value for ignition timing measuring, followed by storage of the operated ignition timing $\Theta$ig in a register is repeated. The ignition timing is operated by interpolation by means of the map stored in the ROM.

Figure 22:
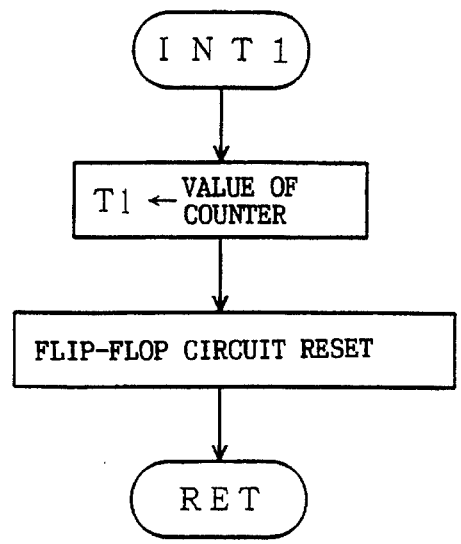
FIGS. 22 and 23 each are a flow chart showing an algorithm of each of interruption routines different from each other executed by a microcomputer in the embodiment of FIG. 17.

When the interrupt control circuit 4b is fed with an external interrupt signal at a boundary position between the charge period and the non-charge period, interrupt processing shown in FIG. 22 is carried out, so that a counted value of the counter 4e during the processing is stored in the form of a boundary detection signal generation time T1 in a RAM 4c and a flip-flop circuit 4j is reset. A process in which the counted value of the counter 4e is stored in the RAM 4c when the external interrupt signal IN1 is fed permits a boundary detection time storage means to be realized. Resetting of the flip-flop circuit 4j causes an output of a positive logic output terminal Q thereof to be rendered "0", so that a potential Ve at the output port A of the microcomputer is rendered "0".

Figure 23:
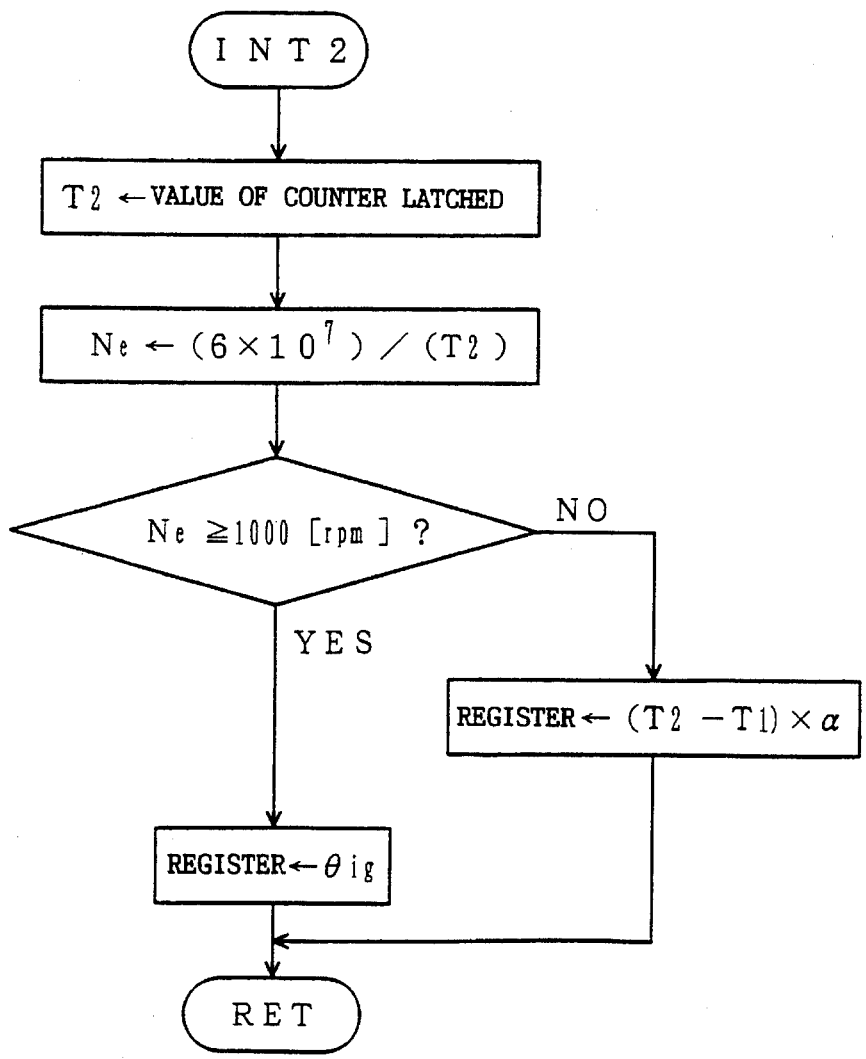

When the interrupt control circuit 4b is fed with an external interrupt signal IN2, interrupt processing shown in FIG. 23 takes place, so that a counted value of the counter latched by the latch circuit 4h (which corresponds to a period of time required for one revolution of the engine) is stored in the form of a reference signal generation time T2. In the illustrated embodiment, a rotational speed Ne of the engine is calculated according to an operational expression Ne=6× $10^7$/T2, supposing that a cycle of clock pulses counted by the counter 4e is 1 μsec. The rotational speed Ne thus operated is stored in the RAM 4c.

When the rotational speed Ne is below a set level (which, in the illustrated embodiment, is defined to be 1000 rpm), an operation (T2−T1)×α wherein a period of time from the boundary detection signal generation time (starting time of the non-charge period) to the reference signal generation time is multiplied by a constant α(≦1) takes place, so that a result of the operation is stored in the register, followed by return to the main routine. Whereas, when the rotational speed Ne is at 1000 rpm or more, an ignition timing measuring counted value Θig operated by means of the map in the main routine is stored in the register.

In the illustrated embodiment, an ignition timing operational means is realized by a process of operating the ignition timing (the ignition timing measuring counted value) Θig by map operation in the main routine shown in FIG. 10 and a process of operating the ignition timing measuring counted value (T2−T1)×α during each of starting operation and extremely low speed operation of the engine in the interrupt routine shown in FIG. 23.

The microcomputer 4 is provided therein with a comparator 4f, which functions to constantly carry out comparison between a counted value of the counter 4e (a length of time elapsed from time at which the reference position is detected) and contents of the register 4g, so that when the counted value of the counter coincides with the contents of the register at a rotation angle position corresponding to an ignition timing Θig, the comparator 4f feeds a set terminal S of the flip-flop circuit 4j with a set signal.

When the flip-flop circuit 4j is thus fed with a set signal, a signal Ve at the output port A of the microcomputer 4 is varied from a state "0" to a state "1" as shown in (E) of FIG. 9, so that the ignition timing detection signal feed circuit 9 generates an ignition timing detection signal Vf as shown in (F) of FIG. 9. This permits the discharge thyristor Th1 of an ignition circuit 3 to be fed with an ignition signal Vi at a rotation angle position corresponding to the ignition timing Θig operated, resulting in ignition operation being carried out.

In the illustrated embodiment, the counter 4e, comparator 4f, register 4g, flip-flop circuit 4j and ignition timing detection signal feed circuit 9 and the process of setting an ignition timing measuring counted value Θig or (T2−T1)×α in the register 4g depending on an engine speed in the interrupt routine shown in FIG. 23 cooperate with each other to realize an ignition signal generating means which starts counting of clock pulses when a reference signal is generated and generates an ignition signal when a value obtained by the counting coincides with the ignition timing measuring counted value.

As described above, the ignition device of the illustrated embodiment is constructed so as to carry out ignition operation when a period of time (T2−T1)×α elapses after generation of a reference signal in the case that a rotational speed of the engine is below 1000 rpm. The magnitude (T2−T1) corresponds to an angle from a boundary position (a starting position of the non-charge period) between the charge-period and the non-charge period to a reference position; so that when a value α(T2−T1) obtained by multiplying the magnitude by a constant α(≦1) is used as an ignition timing measuring counted value and an ignition signal is generated after clock pulses are counted by the counted value from a reference position, it is possible to generate an ignition signal for each of the starting operation and extremely low speed operation at a position delayed by an angle corresponding to the counted value α(T2−T1) from the reference position (a maximum advanced position or a position advanced from the maximum advanced position). The constant α is so set that a position at which the ignition signal is generated is advanced from a position at which a positive half cycle of the exciter coil is started.

The above-described construction of the illustrated embodiment permits an ignition signal for each of the starting operation and extremely low speed operation to be generated at a position delayed from a maximum advanced position, to thereby prevent the piston from being pushed back during the starting operation.

Figure 18:
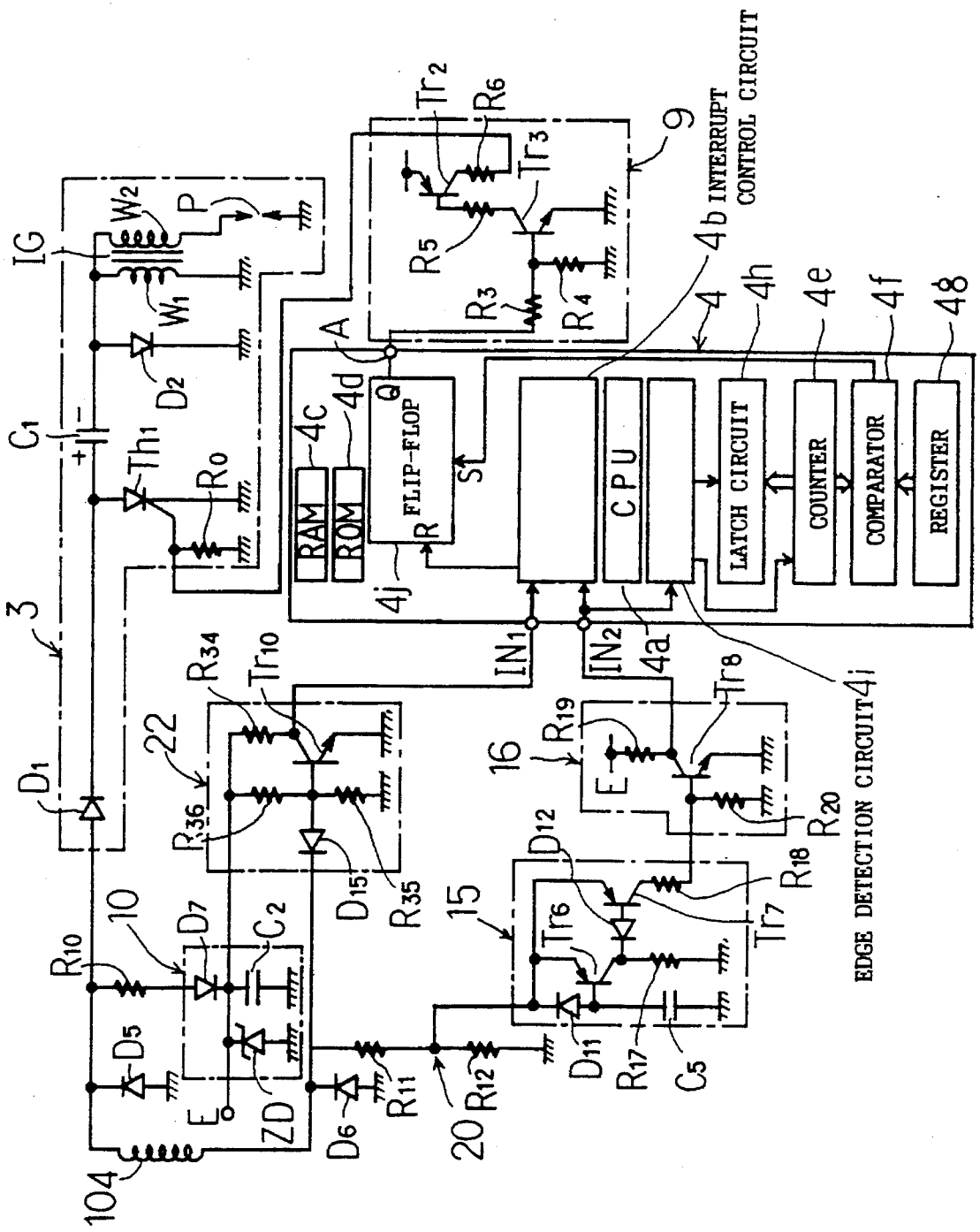

Embodiment of FIG. 18

In an embodiment of FIG. 18, a reference signal generating circuit comprises a peak detection circuit 15 and a reference signal generated from the peak detection circuit is fed in the form of an external interrupt signal IN 2 through a signal output circuit 16 to a microcomputer 4. The peak detection circuit 15 providing the reference signal generating circuit and the interrupt signal output circuit 16 are constructed in substantially the same manner as in the embodiment shown in FIG. 13 and operation of the illustrated embodiment is carried out in substantially the same manner as in the embodiment of FIG. 17, except that a reference signal is generated at a peak position of an output voltage of a negative half cycle of an exciter coil.

Figure 19:
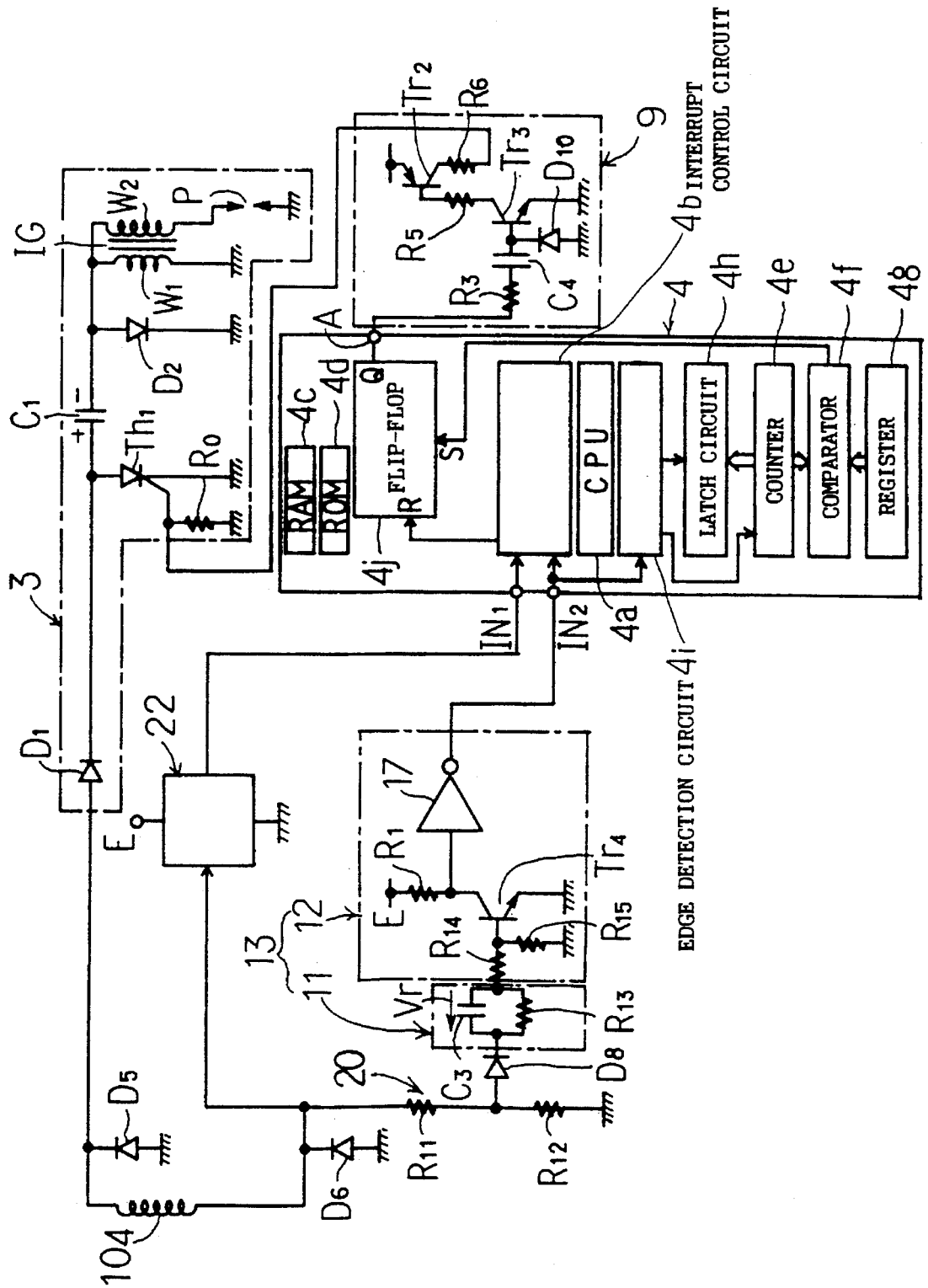

Embodiment of FIG. 19

FIG. 19 shows a still another embodiment of the present invention, wherein an NPN transistor Tr4 having an emitter ground, a collector connected through a resistor R1 to an output terminal of a DC power circuit and a base connected through a resistor R14 to a reference voltage generating circuit 11 and an inverter 17 connected at an input terminal thereof to the collector of the transistor Tr4 cooperate with each other to provide a reference signal output circuit 12 as in the embodiment of FIG. 17, so that a reference signal outputted from the inverter 17 is inputted in the form of an external interrupt signal IN2 to an interrupt control circuit 4b of a microcomputer 4. The remaining part of the illustrated embodiment may be constructed in substantially the same manner as the embodiment of FIG. 17. In the illustrated embodiment, the transistor Tr4, the resistor R1, the resistor R14 and a resistor R15 cooperate with each other to provide a reference level detection switch which exhibits states different from each other between when a level of an output voltage of a voltage detection circuit 20 is at a level of a reference voltage Vr or below and when it is above the reference voltage. The inverter 17 provides a level variation detection circuit for detecting a variation in level of a voltage across the reference level detection switch occurring when a level of an output voltage of the voltage detection circuit is at a level of the reference voltage or below in the course during which a level of an output voltage of a magneto during a non-charge period is decreased past peak, resulting in generating a reference signal.

In the embodiment of FIG. 19, when a level of an output voltage Vb of the voltage detection circuit 20 coincides with a level of the reference voltage Vr in the course during which an output voltage of a negative half cycle of an exciter coil 104 is increased toward a peak value, the transistor Tr4 is turned on to cause a potential at the collector to be reduced. Also, when a level of an output voltage Vb of the voltage detection circuit 20 coincides with a level of the reference voltage Vr in the course during which an output voltage of a negative half cycle of the exciter coil is decreased past peak, resulting in the transistor Tr4 being rendered turned off, a potential at the collector of the transistor is varied from a low level to a high level, so that a level of an output voltage of the inverter 17 is reduced from a state "1" to a state "0" (leading to generation of a reference signal), resulting in an interrupt signal IN2 being fed to the microcomputer 4.

Thus, in the embodiment of FIG. 19, when a level of an output voltage of the voltage detection circuit coincides with a level of the reference voltage Vr in the course during which a level of an output voltage of a negative half cycle of the exciter coil is decreased past peak, a reference signal is generated. The remaining part of operation of the illustrated embodiment is carried out in substantially the same manner as in the embodiment of FIG. 17.

In the embodiment of FIG. 19, the inverter 17 is used to detect a variation in voltage across a connector-emitter circuit of the transistor Tr4 occurring when an output voltage of the exciter coil during the non-charge period is at a level of the reference voltage or below in the course during which the output voltage is decreased past peak. Alternatively, the embodiment may be so constructed that a variation in voltage across a connector-emitter circuit of the transistor Tr4 occurring when an output voltage of the exciter coil during the non-charge period is at a level of the reference voltage or below in the course during which the output voltage is decreased past peak is detected by means of a differentiation circuit, resulting in a reference signal being generated.

Figure 20:
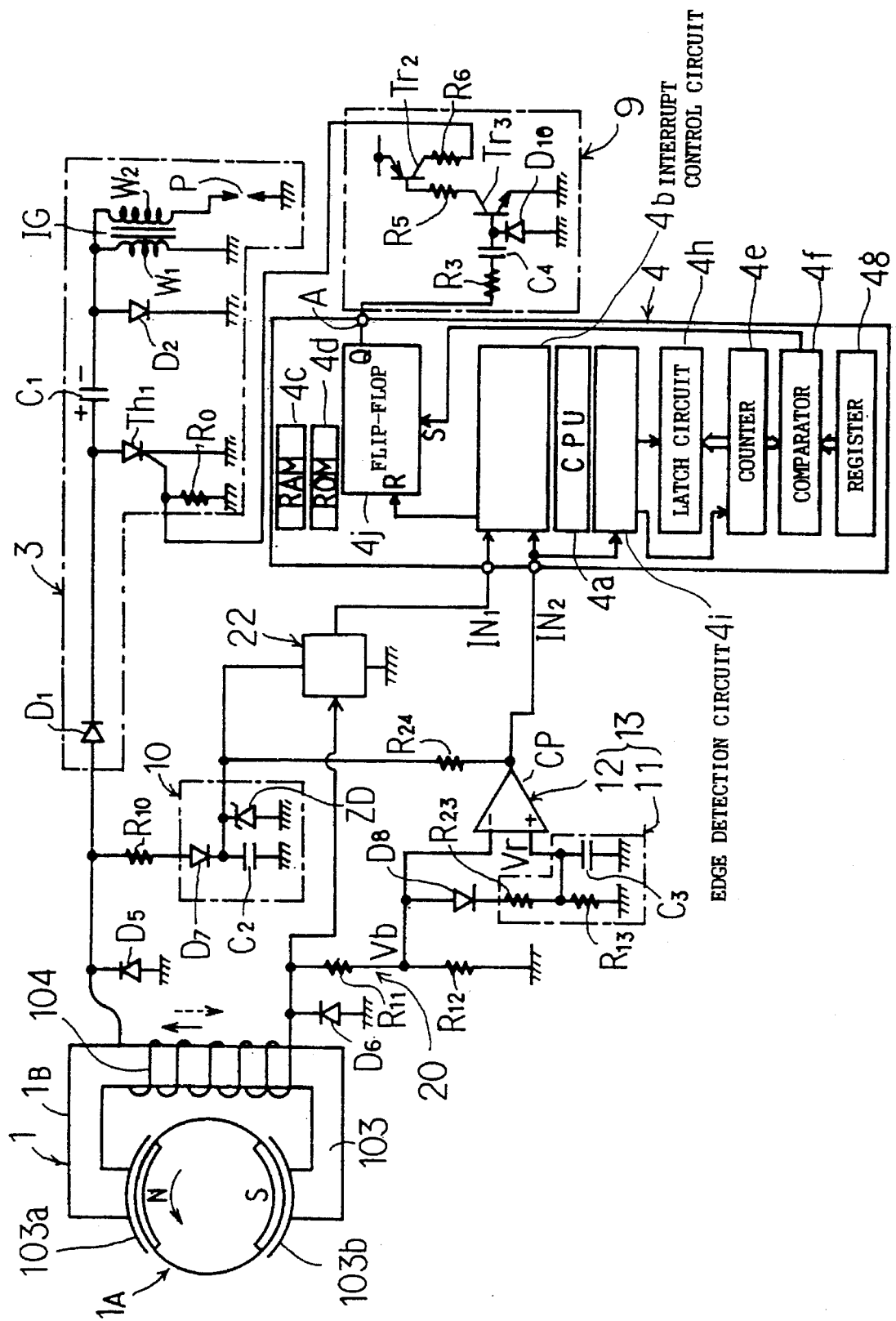

Embodiment of FIG. 20

FIG. 20 shows yet another embodiment of the present invention, wherein a reference signal generating circuit 13 is constructed in substantially the same manner as in the embodiment of FIG. 5. The remaining part of the illustrated embodiment may be constructed in substantially the same manner as the embodiment of FIG. 17.

In the embodiment of FIG. 20, a level of a reference voltage Vr induced across a capacitor C3 is varied with a variation in peak value and frequency of an output voltage of a negative half cycle of an exciter coil. When a level of an output voltage Vb of a voltage detection circuit 20 coincides with a level of the reference voltage Vr in the course during which an output voltage of a negative half cycle of the exciter coil is increased toward a peak value, a potential at an output terminal of a comparator CP falls. Such a decrease in potential is fed in the form of an interrupt signal IN 2 (a reference signal) to a microcomputer. The remaining part of operation of the illustrated embodiment is carried out in substantially the same manner as in the embodiment of FIG. 17.

Figure 21:
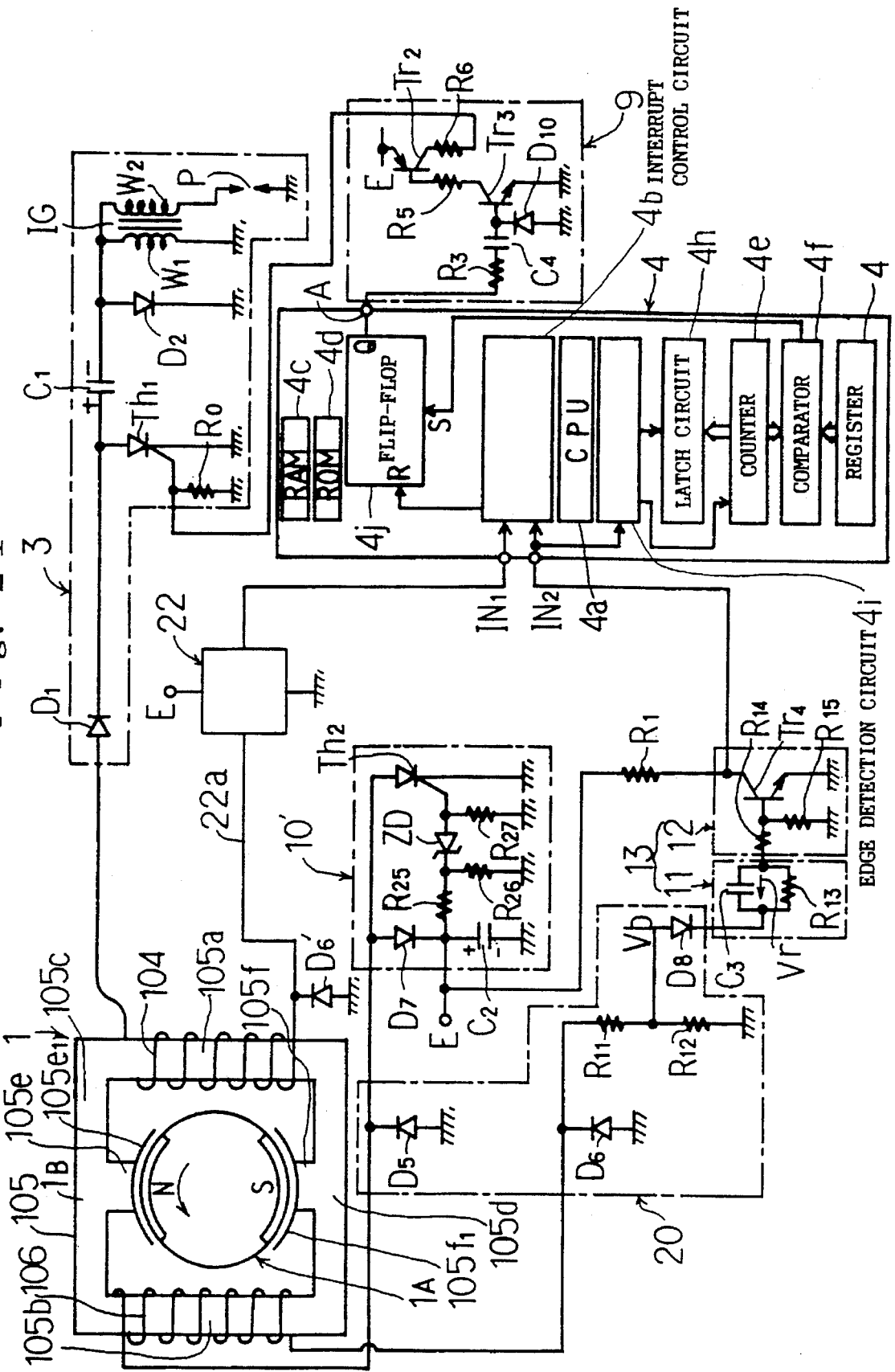

Embodiment of FIG. 21

FIG. 21 shows an embodiment of the present invention wherein when a boundary detection circuit 22 is used, an output of a generating coil in addition to an exciter coil is utilized to generate a reference signal. A magneto 1 and a reference signal generating circuit 13 are constructed in substantially the same manner as those in the embodiment shown in FIG. 6.

The embodiment of FIG. 21 may be operated in substantially the same manner as the embodiment of FIG. 17, except that a reference signal is generated by means of a waveform of an output voltage of a negative half cycle generated by a generating coil 106 while an exciter coil 104 generates an output voltage of a negative half cycle (or an output voltage of a half cycle of the magneto 1 during a non-charge period).

In the embodiment of FIG. 21, the boundary detection circuit 22 detects a boundary between a charge period and the non-charge period based on an output of the exciter coil 104. Alternatively, the illustrated embodiment may be so constructed that the boundary detection circuit 22 is connected at an input terminal 22a thereof to a connection between the generating coil 106 and a diode D6, to thereby detect a boundary between the charge period and the non-charge period based on an output of the generating coil 106.

In the embodiment of FIG. 18 described above, the peak detection circuit 15 providing the reference signal generating circuit may be generally constructed of a peak detection capacitor, a first peak detection transistor fed with a base current through the peak detection capacitor by means of an output of a negative half cycle of the exciter coil, resulting in being turned on, and a second peak detection transistor kept turned off when the first peak detection transistor is kept turned on and rendered turned on when the first peak detection transistor is turned off, to thereby output a reference signal. The peak detection circuit 15 is not limited to such a construction as specified in the above-described embodiments.

The ignition circuit 3 of the capacitor discharge type incorporated in the present invention is not limited to such a construction as specified in the embodiments described above. For example, the present invention may be of course applied to such an ignition circuit of the capacitor discharge type as known in the art wherein the ignition energy accumulating capacitor C1 and discharge thyristor Th1 are positionally replaced with each other.

In the present invention, it is required to reduce load of the magneto during the non-charge period to the utmost. For this purpose, a power supply for the power circuit 10 preferably utilizes either an output of a positive half cycle of the exciter coil 104 or an output of the generating coil 106 provided in addition to the exciter coil 104 in the the magneto. It is preferable to minimize a current flowing from the exciter coil 104 or generating coil 106 into the reference signal generating circuit 13 and peak position detection circuit 15. This is accomplished by, for example, increasing an impedance of the voltage dividing circuit of the resistors R11 and R12 to the utmost.

In each of the embodiments of FIGS. 6, 16 and 21, the magneto may be so constructed that the generating coil 106 outputs a voltage of a phase opposite to that of an output voltage of the exciter coil 104 (in such a manner that, for example, a direction of winding of the generating coil 106 is opposite to that of the exciter coil 104), resulting in a reference signal being obtained by means of a waveform of an output voltage of a positive half cycle of the generating coil 106 (or an output voltage of the magneto during the non-charge period).

In each of the embodiments described above, the rotor of the magneto is constructed into a two-pole structure, so that the magneto may induce an AC voltage of one cycle at every one rotation of the engine. However, the present invention is not limited to use of such a magneto including a two-pole rotor. It may be applied to use of a magneto including a multi-pole magnet rotor. For example, incorporation of a four-pole magnet rotor in the present invention causes the magneto to output an AC voltage of two cycles at every one rotation of the engine, resulting in a reference signal being generated twice, so that ignition operation is carried out at an angular interval of 180 degrees twice at every one rotation of the engine. Thus, in a two-cycle engine, when ignition spark for one of the two ignition operations carried out at an angular interval of 180 degrees is generated at a rotation angle position corresponding to a predetermined ignition timing, ignition spark for the other ignition operation is generated at a position which does not affect operation of the engine (for example, an end of an exhaust stroke of the engine), so that smooth operation of the engine is ensured.

When a battery is mounted on a vehicle, driving of the microcomputer and the like may be carried out by means of the battery.

When a battery is mounted on a vehicle, a ship or the like, the present invention is preferably constructed so as to drive the microcomputer by means of an output of the magneto as in each of the embodiments described above in order to smoothly operate the engine through operation of the microcomputer even when the battery is subject to over-discharge.

The above-described embodiments each are so constructed that the microcomputer recognizes a negative logic signal. However, when the microcomputer is constructed so as to recognize a positive logic signal, each of the embodiments may further include an additional circuit for inverting a polarity of the signal or may be constructed so as to permit the signal to be taken out at a different position for the purpose of practicing of the present invention.

As described above, the present invention is constructed so as to detect a reference position utilizing a waveform of an output voltage of the magneto in the non-charge period for which the ignition energy accumulating capacitor is kept from being charged. Such construction eliminates a necessity of arranging any signal generator in the ignition device.

Also, the present invention may be so constructed that an ignition timing measuring counted value may be operated by multiplying a period of time from boundary detection signal generation time to reference signal generation time by a constant α of 1 or less when a rotational speed of the engine is below a set level (or during starting operation and extremely low speed operation of the engine). In this instance, the constant may be suitably set, to thereby generate an ignition signal at a rotation angle position suitable as an ignition timing for the starting operation and extremely low speed operation.

The present invention permits a reference signal for detecting a reference position and an ignition signal for determining an ignition timing for each of the starting operation and extremely low speed operation to be generated without using any signal generator, leading to simplification in construction of the magneto, small-sizing of the ignition device and cost-saving of the device.

Industrial Applicability

As can be seen form the foregoing, the ignition device of the capacitor discharge type according to the present invention is so constructed that a reference signal for providing a reference position at which measuring of an ignition timing is started is generated by means of an output of the magneto provided with the exciter coil for capacitor charging, resulting in eliminating arrangement of any signal generator. Thus, the present invention accomplishes small-sizing and cost-saving of an ignition device for an internal combustion engine of which an ignition timing is controlled by means of a microcomputer in order to promote purification of exhaust gas and improve a fuel consumption rate.

I claim:

1. An ignition device of the capacitor discharge type for an internal combustion engine, comprising:

a magneto having at least an exciter coil for capacitor charging arranged on a side of a stator thereof and constructed so as to generate an AC voltage in synchronism with rotation of the internal combustion engine;

an ignition energy accumulating capacitor arranged on a side of a primary winding of an ignition coil;

a capacitor charging circuit for charging said ignition energy accumulating capacitor by means of an output voltage of said exciter coil during a charge period while defining a rotation angle period during which said exciter coil generates an output voltage of a positive half cycle and that during which it generates an output voltage of a negative half cycle as said charge period of said capacitor and a non-charge period thereof, respectively;

a discharge switch turned on when it is fed with an ignition signal, to thereby permit charges in said ignition energy accumulating capacitor to be discharged to said primary winding of said ignition coil;

a reference signal generating circuit for generating a reference signal when a level of an output voltage of said magneto during said non-charge period coincides with a reference level varied in magnitude depending on a variation in output voltage and output frequency of said magneto;

an ignition timing operational means for operating an ignition timing at every rotational speed of the internal combustion engine;

an ignition timing detection signal generating means for generating an ignition timing detection signal when measuring of the ignition timing operated by said ignition timing operational means is completed after the measuring is started at the time of generation of said reference signal; and a circuit for feeding said discharge switch with an ignition signal when said ignition timing detection signal is generated;

said reference level having a variation rate adjusted so that said reference signal is generated at a position rendered constant irrespective of a peak value of an output voltage of said magneto during said non-charge period and a frequency thereof.

2. An ignition device of the capacitor discharge type for an internal combustion engine, comprising:

a magneto having at least an exciter coil for capacitor charging arranged on a side of a stator thereof and constructed so as to generate an AC voltage in synchronism with rotation of the internal combustion engine;

an ignition energy accumulating capacitor arranged on a side of a primary winding of an ignition coil;

a capacitor charging circuit for charging said ignition energy accumulating capacitor by means of an output voltage of said exciter coil during a charge period while defining a rotation angle period during which said exciter coil generates an output voltage of a positive half cycle and that during which it generates an output voltage of a negative half cycle as said charge period of said capacitor and a non-charge period thereof, respectively;

a discharge switch turned on when it is fed with an ignition signal, to thereby permit charges in said ignition energy accumulating capacitor to be discharged to said primary winding of said ignition coil;

a reference signal generating circuit for generating a reference signal at a reference position at which measuring of an ignition timing of the internal combustion engine is started;

an ignition timing operational means for operating an ignition timing at every rotational speed of the internal combustion engine;

an ignition timing detection signal generating means for generating an ignition timing detection signal when measuring of the ignition timing operated by said ignition timing operational means is completed after the measuring is started at the time of generation of said reference signal; and a circuit for feeding said discharge switch with an ignition signal when said ignition timing detection signal is generated;

said reference signal generating circuit including a voltage detection circuit for detecting an output voltage of the magneto during said non-charge period, a reference voltage generating circuit for generating a reference voltage varied in magnitude depending on a variation in output voltage and output frequency of the magneto during said non-charge period and a reference signal output circuit for outputting said reference signal when an output voltage of said voltage detection circuit coincides with said reference voltage;

said reference voltage generating circuit being constructed of a circuit which includes a reference voltage generating capacitor charged by means of an output voltage of the magneto during said non-charge period and a discharge resistor connected in parallel to said reference voltage generating capacitor and generates said reference voltage across said reference voltage generating capacitor;

said reference voltage having a variation rate adjusted so as to render a generation position of said reference signal constant irrespective of a peak value and a frequency of an output voltage of the magneto during said non-charge period.

3. An ignition device of the capacitor discharge type for an internal combustion engine as defined in claim 2, wherein said reference signal output circuit includes a reference signal generating switch operating when a level of an output voltage of said voltage detection circuit coincides with a level of said reference voltage in the course during which an output voltage of the magneto during said non-charge period is increased toward a peak value, so that a variation in voltage across said reference signal generating switch occurring when it operates is used as said reference signal.

4. An ignition device of the capacitor discharge type for an internal combustion engine as defined in claim 2, wherein said reference signal output circuit includes a reference level detection switch for respectively exhibiting states different from each other when a level of an output voltage of said voltage detection circuit is equal to or below a level of said reference voltage and when the former level exceeds the latter level and a level variation detection circuit for detecting a variation in voltage across said reference level detection switch when a level of an output voltage of said voltage detection circuit coincides with a level of said reference voltage in the course during which a level of an output voltage of the magneto during said non-charge period is decreased past peak to output said reference signal.

5. An ignition device of the capacitor discharge type for an internal combustion engine as defined in any one of claims 1 to 4, further comprising an OR circuit to which said ignition timing detection signal and reference signal are inputted;

a mask switch arranged so as to bypass said reference signal from said OR circuit when it is turned on; and a mask switch drive means for turning on said mask switch when a rotational speed of the internal combustion engine is at a set level or above;

said OR circuit generating an output which is fed in the form of said ignition signal to the discharge switch.

6. An ignition device of the capacitor discharge type for an internal combustion engine as defined in claim 3, further comprising a peak detection circuit for detecting a peak position of an output of the magneto during said non-charge period to output a peak detection signal;

an OR circuit to which said ignition timing detection signal and peak detection signal are inputted;

a mask switch arranged so as to bypass said peak detection signal from said OR circuit when it is turned on; and a mask switch trigger means for triggering said mask switch in a region in which a rotational speed of the internal combustion engine is equal to or above a set level, to thereby turn on it;

said OR circuit generating an output which is fed in the form of said ignition signal to the discharge switch.

7. An ignition device of the capacitor discharge type for an internal combustion engine, comprising:

a magneto having at least an exciter coil for capacitor charging arranged on a side of a stator thereof and constructed so as to generate an Ac voltage in synchronism with rotation of the internal combustion engine;

an ignition energy accumulating capacitor arranged on a side of a primary winding of an ignition coil;

a capacitor charging circuit for charging said ignition energy accumulating capacitor by means of an output voltage of said exciter coil during a charge period while defining a rotation angle period during which said exciter coil generates an output voltage of a positive half cycle and that during which it generates an output voltage of a negative half cycle as said charge period of said capacitor and a non-charge period thereof, respectively;

a discharge switch turned on when it is fed with an ignition signal, to thereby permit charges in said ignition energy accumulating capacitor to be discharged to said primary winding of said ignition coil;

a reference signal generating circuit for generating a reference signal at a reference position at which measuring of an ignition timing of the internal combustion engine is started;

an ignition timing operational means for operating an ignition timing at every rotational speed of the internal combustion engine;

an ignition timing detection signal generating means for generating an ignition timing detection signal when measuring of the ignition timing operated by said ignition timing operational means is completed after the measuring is started at the time of generation of said reference signal;

a reference voltage generating circuit for generating a reference voltage varied in level depending on a variation in output voltage and output frequency of the magneto during said non-charge period;

a voltage detection circuit for detecting an output voltage of the magneto during said non-charge period;

a reference signal/fixed ignition timing signal generating circuit for generating a reference signal when a level of an output voltage of said voltage detection circuit coincides with a level of the reference voltage in the course during which a level of an output voltage of the magneto during said non-charge period is increased toward a peak value and generating a fixed ignition timing signal when an output voltage of said voltage detection circuit coincides with a level of the reference voltage in the course during which a level of an output voltage of the magneto during said non-charge period is decreased past peak; and an OR circuit to which said ignition timing detection signal and fixed ignition timing signal are inputted and which feeds said discharge switch with an ignition signal when either the ignition timing detection signal or the fixed ignition timing signal is generated;

said reference voltage having a variation rate adjusted so as to render a generation position of said reference signal constant irrespective of a peak value and a frequency of an output voltage of the magneto during said non-charge period.

8. An ignition device of the capacitor discharge type for an internal combustion engine, comprising:

a magneto having at least an exciter coil for capacitor charging arranged on a side of a stator thereof and constructed so as to generate an Ac voltage in synchronism with rotation of the internal combustion engine;

an ignition energy accumulating capacitor arranged on a side of a primary winding of an ignition coil;

a capacitor charging circuit for charging said ignition energy accumulating capacitor by means of an output voltage of said exciter coil during a charge period while defining a rotation angle period during which said exciter coil generates an output voltage of a positive half cycle and that during which it generates an output voltage of a negative half cycle as said charge period of said capacitor and a non-charge period thereof, respectively;

a discharge switch turned on when it is fed with an ignition signal, to thereby permit charges in said ignition energy accumulating capacitor to be discharged to said primary winding of said ignition coil;

a reference signal generating circuit to which an output voltage of the magneto during said non-charge period is inputted and which generates a reference signal when a peak of said output voltage is detected;

an ignition timing operational means for operating an ignition timing at every rotational speed of the internal combustion engine; and an ignition timing detection signal generating means for generating an ignition timing detection signal when measuring of the ignition timing operated by said ignition timing operational means is completed after the measuring is started at the time of generation of said reference signal;

said discharge switch being fed with said ignition signal when said ignition timing detection signal is generated.

9. An ignition device of the capacitor discharge type for an internal combustion engine as defined in claim 8, further comprising an OR circuit to which said ignition timing detection signal and reference signal are inputted, a reference signal mask switch arranged so as to bypass said reference signal from said OR circuit when it is turned on, and a reference signal mask switch drive means for turning on said reference signal mask switch when a rotational speed of the internal combustion engine is at a set level or above, said OR circuit generating an output which is fed in the form of said ignition signal to the discharge switch.

10. An ignition device of the capacitor discharge type for an internal combustion engine as defined in claim 8, wherein said magneto is so arranged that a position at which a period of a half cycle of an output of the magneto during said non-charge period terminates is a set position delayed from a maximum advanced position of the internal combustion engine; and further comprising a fixed ignition timing signal generating circuit for detecting a position at which a period of a half cycle of an output of the magneto during said non-charge period terminates to generate a fixed ignition timing signal, and an OR circuit to which said ignition timing detection signal and fixed ignition timing signal are inputted and which feeds said discharge switch with said ignition signal when either the ignition timing detection signal or the fixed ignition timing signal is generated.

11. An ignition device of the capacitor discharge type for an internal combustion engine as defined in claim 10, wherein said fixed ignition timing signal generating circuit includes a waveform shaping circuit for shaping an output of the magneto during said non-charge period into a rectangular-wave signal and a differentiation circuit for detecting falling of a rectangular-wave signal generated from said waveform shaping circuit to generate a pulse-like signal in the form of said fixed ignition timing signal.

12. An ignition device of the capacitor discharge type for an internal combustion engine as defined in claim 10, wherein said fixed ignition timing signal generating circuit includes a fixed ignition timing detection transistor turned-on when it is fed with a drive signal by means of an output voltage of the magneto during said non-charge period and kept turned on during a period for which an output voltage during said non-charge period is generated and a differentiation circuit for differentiating a voltage across a collector-emitter circuit of said fixed ignition timing detection transistor, said differentiation circuit generating a pulse signal when said fixed ignition timing detection transistor is turned off, said pulse signal being used as said fixed ignition timing signal.

13. An ignition device of the capacitor discharge type for an internal combustion engine as defined in any one of claims 8 to 12, wherein said reference signal generating circuit includes a peak detection capacitor, a first peak detection transistor turned on when it is fed with a base current through said peak detection capacitor by means of an output of a half cycle of the magneto during said non-charge period, and a second peak detection transistor kept turned off when said first peak detection transistor is kept turned on and turned on to output said reference signal when said first peak detection transistor is turned off.

14. An ignition device of the capacitor discharge type for an internal combustion engine, comprising:

a magneto having at least an exciter coil for capacitor charging arranged on a side of a stator thereof and constructed so as to generate an AC voltage in synchronism with rotation of the internal combustion engine;

an ignition energy accumulating capacitor arranged on a side of a primary winding of an ignition coil;

a capacitor charging circuit for charging said ignition energy accumulating capacitor by means of an output voltage of said exciter coil during a charge period while defining a rotation angle period during which said exciter coil generates an output voltage of a positive half cycle and that during which it generates an output voltage of a negative half cycle as said charge period of said capacitor and a non-charge period thereof, respectively;

a discharge switch turned on when it is fed with an ignition signal, to thereby permit charges in said ignition energy accumulating capacitor to be discharged to said primary winding of said ignition coil;

a reference signal generating circuit for generating a reference signal at a reference position at which measuring of an ignition timing of the internal combustion engine is started;

a boundary detection circuit for detecting a boundary between said charge period and said non-charge period to generate a boundary detection signal at the time of transition from said charge period to said non-charge period;

a boundary detection time storage means for storing generation time of said boundary detection signal therein;

an ignition timing operational means for operating, in the form of an ignition timing measuring counted value, the number of clock pulses to be counted during rotation of the internal combustion engine from a reference position to a rotation angle position corresponding to an ignition timing with respect to each rotational speed of the internal combustion engine by means of a map providing relationship between a rotational speed of the internal combustion engine and an ignition position thereof when a rotational speed of the internal combustion engine is at a set level or above and operating said ignition timing measuring counted value by multiplying a period of time from the generation time of said boundary detection signal to generation time of the reference signal by a constant of 1 or less when the rotational speed is below the set level; and an ignition signal generating means for starting counting of clock pulses when said reference signal is generated, to thereby generate said ignition signal when the counted value coincides with said ignition timing measuring counted value;

said reference signal generating circuit including a reference voltage generating circuit for generating a reference voltage varied in level depending on a variation in output voltage and output frequency of the magneto during said non-charge period, a voltage detection circuit for detecting an output voltage of the magneto during said non-charge period, and a reference signal output circuit for outputting said reference signal when a level of an output voltage of said voltage detection circuit coincides with a level of said reference voltage, said reference voltage having a variation rate adjusted so as to render a generation position of said reference signal constant irrespective of a peak value and a frequency of an output voltage of the magneto during said non-charge period.

15. An ignition device of the capacitor discharge type for an internal combustion engine as defined in claim 14, wherein said reference voltage generating circuit includes a reference voltage generating capacitor charged by means of an output voltage of the magneto during said non-charge period and a discharge resistor connected in parallel to said reference voltage generating capacitor.

16. An ignition device of the capacitor discharge type for an internal combustion engine as defined in claim 14 or 15, wherein said reference signal output circuit includes a reference signal generating switch operating when a level of an output voltage of said voltage detection circuit coincides with a level of said reference voltage in the course during which a level of an output voltage of the magneto during said non-charge period is increased toward a peak value, so that a variation in voltage across said reference signal generating switch occurring when it operates is used as said reference signal.

17. An ignition device of the capacitor discharge type for an internal combustion engine as defined in claim 14 or 15, wherein said reference signal output circuit includes a reference level detection switch for respectively exhibiting states different from each other when a level of an output voltage of said voltage detection circuit is equal to or below a level of said reference voltage and when the former level exceeds the latter level and a level variation detection circuit for detecting a variation in level of voltage across said reference level detection switch when a level of an output voltage of said voltage detection circuit is equal to or below a level of said reference voltage in the course during which a level of an output voltage of the magneto during said non-charge period is decreased past a peak to output said reference signal.

18. An ignition device of the capacitor discharge type for an internal combustion engine, comprising:

a magneto having at least an exciter coil for capacitor charging arranged on a side of a stator thereof and constructed so as to generate an AC voltage in synchronism with rotation of the internal combustion engine;

an ignition energy accumulating capacitor arranged on a side of a primary winding of an ignition coil;

a capacitor charging circuit for charging said ignition energy accumulating capacitor by means of an output voltage of said exciter coil during a charge period while defining a rotation angle period during which said exciter coil generates an output voltage of a positive half cycle and that during which it generates an output voltage of a negative half cycle as said charge period of said capacitor and a non-charge period thereof, respectively;

a discharge switch turned on when it is fed with an ignition signal, to thereby permit charges in said ignition energy accumulating capacitor to be discharged to said primary winding of said ignition coil;

a reference signal generating circuit for generating a reference signal at a reference position at which measuring of an ignition timing of the internal combustion engine is started;

a boundary detection circuit for detecting a boundary between said charge period and said non-charge period to generate a boundary detection signal at the time of transition from said charge period to said non-charge period;

a boundary detection time storage means for storing generation time of said boundary detection signal therein;

an ignition timing operational means for operating, in the form of an ignition timing measuring counted value, the number of clock pulses to be counted during rotation of the internal combustion engine from a reference position to a rotation angle position corresponding to an ignition timing with respect to each rotational speed of the internal combustion engine by means of a map providing relationship between a rotational speed of the internal combustion engine and an ignition position thereof when a rotational speed of the internal combustion engine is at a set level or above and operating said ignition timing measuring counted value by multiplying a period of time from the generation time of said boundary detection signal to generation time of the reference signal by a constant of 1 or less when the rotational speed is below the set level; and an ignition signal generating means for starting counting of clock pulses when said reference signal is generated, to thereby generate said ignition signal when the counted value coincides with said ignition timing measuring counted value;

said reference signal generating circuit including a peak detection circuit for generating said reference signal when it detects a peak of an output voltage of the magneto during said non-charge period.

19. An ignition device of the capacitor discharge type for an internal combustion engine as defined in claim 18, wherein said peak detection circuit includes a peak detection capacitor, a first peak detection transistor turned on when it is fed with a base current through said peak detection capacitor by means of an output of a negative half cycle of the exciter coil, and a second peak detection transistor kept turned off when said first peak detection transistor is kept turned on and turned on to output the reference signal when said first peak detection transistor is turned off.

* * * * *